United States Patent
Fellabaum

(10) Patent No.: US 6,309,570 B1
(45) Date of Patent: Oct. 30, 2001

(54) VACUUM EXTRUSION SYSTEM FOR PRODUCTION OF CEMENT-BASED ARTICLES

(75) Inventor: Terence J. Fellabaum, Hartland, WI (US)

(73) Assignee: American Equipment Systems, Blue Island, IL (US)

(*) Notice: Subject to any disclaimer, the term of this patent is extended or adjusted under 35 U.S.C. 154(b) by 0 days.

(21) Appl. No.: 09/016,587

(22) Filed: Jan. 30, 1998

Related U.S. Application Data

(63) Continuation-in-part of application No. 09/007,158, filed on Jan. 14, 1998, now abandoned.

(51) Int. Cl.[7] .............................. B28B 1/087; B28B 3/22; B28B 3/26; B28C 7/12; B29C 47/76
(52) U.S. Cl. .............................. 264/40.1; 264/70; 264/71; 264/87; 264/102; 264/571; 264/177.11; 264/211.11; 366/15; 366/17; 425/145; 425/197; 425/199; 425/203; 425/205
(58) Field of Search .............................. 264/70, 102, 40.1, 264/177.11, 211.11, 87, 71, 568, 571, 40.4; 425/145, 203, 205, 197, 199; 366/8, 15, 17, 80, 87, 152.3, 152.5

(56) References Cited

U.S. PATENT DOCUMENTS

| 701,957 | 6/1902 | Staley . |
| 1,156,096 | 10/1915 | Price . |

(List continued on next page.)

FOREIGN PATENT DOCUMENTS

858335-A * 12/1979 (SU) .............................. A21C/11/16

*Primary Examiner*—Jan H. Silbaugh
*Assistant Examiner*—Michael I. Poe
(74) *Attorney, Agent, or Firm*—Fish & Richardson P.C.

(57) ABSTRACT

A system for making extruded cement-based articles. The process can include forming a cement-based feed mixture including water, aggregate and binder and directing the feed mixture to a vacuum zone, wherein sufficient vacuum is maintained in the vacuum zone to remove entrained air and, preferably, excess water, from the feed mixture. The feed mixture is held in the vacuum zone at a negative pressure for a time sufficient to form a vacuum-treated or densified mixture. The vacuum-treated or densified mixture is passed through an extruder at an elevated pressure to provide an extruded cement-based article.

57 Claims, 14 Drawing Sheets

U.S. PATENT DOCUMENTS

| | | | |
|---|---|---|---|
| 1,296,472 | | 3/1919 | Brand . |
| 1,478,842 | | 12/1923 | Staley . |
| 2,069,059 | | 1/1937 | Fessler . |
| 2,378,539 | | 6/1945 | Dawihl . |
| 2,605,531 | | 8/1952 | McElroy . |
| 2,617,167 | | 11/1952 | Johnson . |
| 2,904,401 | * | 9/1959 | Booth . |
| 3,177,272 | | 4/1965 | Plymale . |
| 3,186,596 | * | 6/1965 | Badgett . |
| 3,379,421 | * | 4/1968 | Putman . |
| 3,711,067 | * | 1/1973 | Kovacs .................... 259/191 |
| 3,857,715 | * | 12/1974 | Humphrey . |
| 3,872,204 | | 3/1975 | Yano et al. . |
| 3,886,245 | | 5/1975 | Bayer et al. . |
| 4,046,848 | * | 9/1977 | Putti ........................ 264/70 |
| 4,091,462 | * | 5/1978 | Igarashi et al. ............ 366/17 |
| 4,268,316 | | 5/1981 | Wills, Jr. . |
| 4,328,037 | | 5/1982 | Demirel et al. . |
| 4,372,734 | * | 2/1983 | Dolan et al. ............. 425/131.1 |
| 4,416,543 | * | 11/1983 | Brinkmann ................ 366/80 |
| 4,478,516 | * | 10/1984 | Kessler ..................... 366/87 |
| 4,501,618 | | 2/1985 | Gebhard et al. . |
| 4,588,443 | * | 5/1986 | Bache . |
| 4,654,802 | * | 3/1987 | Davis ...................... 364/502 |
| 4,683,006 | | 7/1987 | Walker . |
| 4,778,276 | * | 10/1988 | Meyer et al. ............... 366/2 |
| 4,780,144 | | 10/1988 | Loggers . |
| 4,792,424 | * | 12/1988 | Loman ..................... 264/102 |
| 4,793,954 | * | 12/1988 | Lee et al. .................. 264/23 |
| 4,881,819 | * | 11/1989 | Blees ........................ 366/8 |
| 5,002,611 | | 3/1991 | Rademaker . |
| 5,106,557 | | 4/1992 | Rirsch et al. . |
| 5,108,679 | | 4/1992 | Rirsch et al. . |
| 5,152,837 | | 10/1992 | Rademaker . |
| 5,232,496 | | 8/1993 | Jennings et al. . |
| 5,234,754 | * | 8/1993 | Bache . |
| 5,362,319 | | 11/1994 | Johnson . |
| 5,385,764 | | 1/1995 | Andersen et al. . |
| 5,453,310 | | 9/1995 | Andersen et al. . |
| 5,545,297 | | 8/1996 | Andersen et al. . |
| 5,549,859 | | 8/1996 | Andersen et al. . |
| 5,637,268 | * | 6/1997 | Slattery et al. . |
| 5,639,159 | * | 6/1997 | Sato ......................... 366/75 |
| 5,672,304 | * | 9/1997 | Keilert et al. . |
| 5,756,016 | * | 5/1998 | Huang et al. . |
| 5,766,525 | * | 6/1998 | Andersen et al. . |
| 5,811,048 | * | 9/1998 | Dunn et al. . |
| 5,891,374 | * | 4/1999 | Shah et al. ................ 264/108 |

* cited by examiner

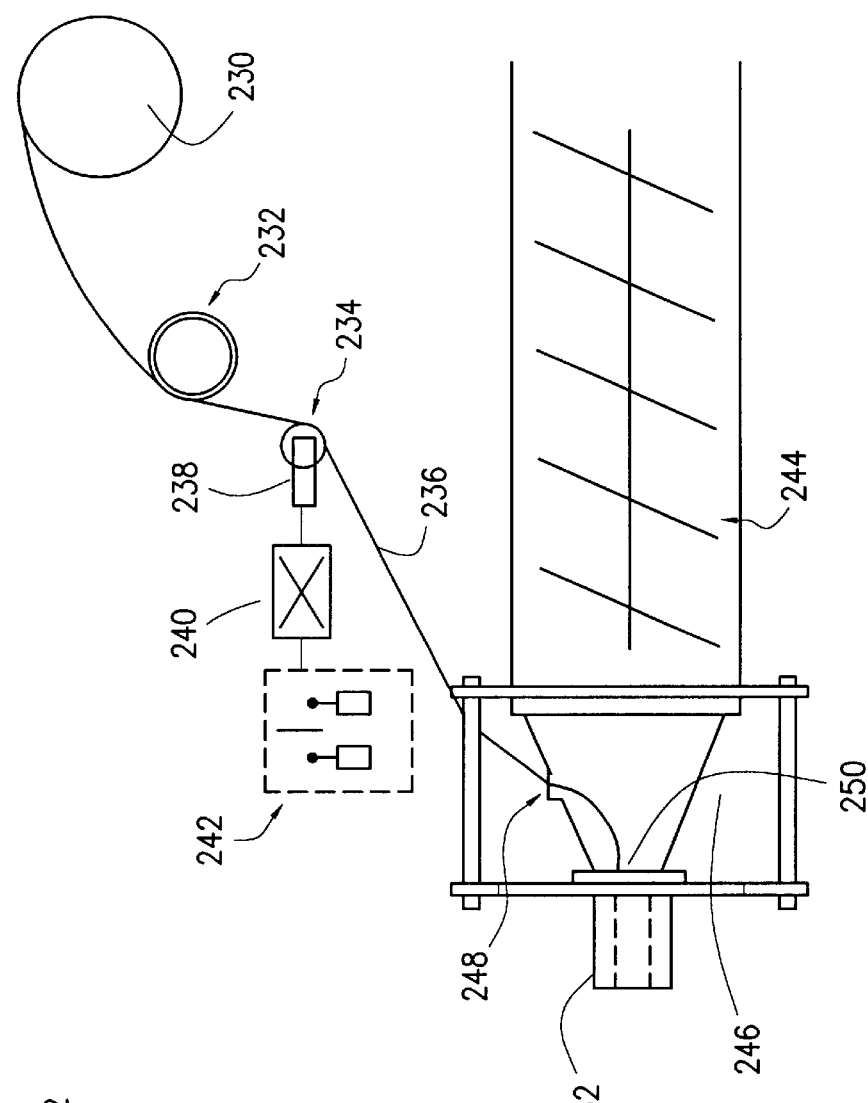
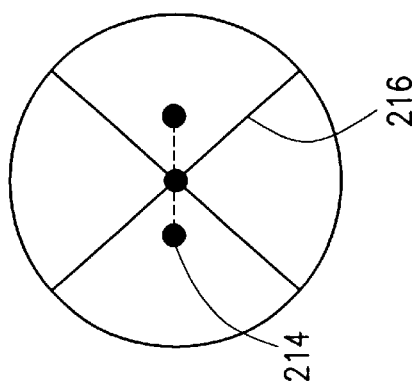

VACUUM EXTRUSION SYSTEM FOR PRODUCTION OF CEMENT-BASED ARTICLES

CROSS REFERENCE TO RELATED APPLICATIONS

This is a continuation-in-part of U.S. patent application Ser. No. 09/007,158, filed Jan. 14, 1998; now abandoned.

BACKGROUND OF INVENTION

A. Field of Invention

The present invention relates in various aspects to extruded concrete articles made from a mixture of water, aggregate and binder. According to the process, the binder hydrates in the presence of the water to form a high-strength concrete article, such as bricks. In another aspect, the invention relates to processes and apparatus for making the concrete articles.

B. Background Art

Various efforts have been made to make extruded concrete articles. But the present inventor is not aware of any successful procedures that have been implemented commercially to provide low cost building materials having properties comparable to conventional "molded" concrete. Accordingly, the present invention is believed to satisfy a long-felt need. It is contemplated that one of the problems with other processes lies in the inability to reliably make articles that meet the specifications of conventional molded concrete. Certain aspects relating to the use of vacuum to make extruded concrete articles have been published. For example, Anderson et al., U.S. Pat. No. 5,549,859, discusses a vacuum-type chamber for making concrete articles. However, these and other processes and devices have various shortcomings, and fail to disclose or suggest the present invention, which includes improved methods and apparatus for making extruded concrete articles.

SUMMARY OF INVENTION

In a specific embodiment, this invention is directed to a process of forming an extruded cement-based article, including the steps of: forming a cement-based feed mixture including water, aggregate and binder; and directing the feed mixture through a pretreatment zone with an entry section and an exit section in which the flow of the feed mixture is restricted such that the volume flow rate at the entry section is greater than the volume flow rate at the exit section. The feed mixture can then be directed to a vacuum zone, wherein sufficient vacuum is maintained in the vacuum zone to remove entrained air from the feed mixture. The feed mixture is held in the vacuum zone for a time sufficient to form a densified mixture; and the densified mixture is directed through an extruder at an elevated pressure to provide an extruded cement-based article. As used herein, the term "cement-based" is to be interpreted broadly, including, for example, materials that are called "cementitious" in U.S. Pat. No. 5,549,859.

Certain embodiments of the process are preferred. Preferably, the feed mixture is directed by a pug mill to the vacuum zone, with mixing blades that are pitched forward for advancing the feed mixture toward the vacuum zone. Where the pretreatment zone includes a barrier surface, e.g., a restrictor plate, after initially contacting the barrier surface in the pretreatment zone, at least a portion of the feed mixture should move parallel to the barrier surface and then pass through the apertures of the barrier toward the vacuum zone. Also, the step of restricting the flow of the feed mixture in the pretreatment zone preferably includes passing the feed mixture through at least two sets of apertures. The feed mixture should be shredded in a vacuum zone. Preferably, the feed mixture is shredded by passing the feed mixture through a multiple-blade rotary shredder, and the feed mixture should be shredded after the flow of the feed mixture is reduced. Preferably, the feed mixture is compressed in the pretreatment zone prior to being directed to the vacuum zone.

Preferably, the vacuum in the vacuum zone is sufficient to remove any excess water from the feed mixture; and the vacuum in the vacuum zone should be maintained at a level of from about −5 to −15 bars, such that it does not vary or fluctuate more than about 1 bar over a period of about 1 hour. The vacuum-treated mixture should have a density within the range of from about 50 to 200 lbs/ft$^3$.

The process preferably includes the step of measuring the moisture level of the feed mixture after the addition of water to determine whether additional water is to be added. Preferably, the process includes measuring the moisture level indirectly. In a specific embodiment, the moisture level is measured by measuring the viscosity or thickness of the feed mixture before the feed mixture is directed to the vacuum zone. The measured viscosity or thickness can be compared to a predetermined reference viscosity or thickness which is or has been correlated with a desired moisture level, and can include the additional step of adding water based on the results of the comparison. Water can be added to lower the viscosity or thickness when the comparison shows that the measured viscosity or thickness is too high. The feed mixture should be mixed using a pug mill with a mixing shaft driven by a motor and wherein the viscosity or thickness of the feed mixture is measured by measuring the load on the motor driving the pug mill shaft. Thus, where the load on the pug mill motor is too high, such that it is above a predetermined reference level, the viscosity can be considered to be too high, and the moisture level too low, whereupon water can be added in proportion to the difference between the measured load and the reference load.

During extrusion, the elevated pressure applied to the densified, vacuum-treated mixture should be less than about 5,000 psi, and preferably is from about 300 psi to 1,500 psi. Preferably, the vacuum-treated mixture is extruded in an extruder that includes an extruder shaft driven by an extruder motor and the load on the pug mill motor is compared to the load on the extruder motor to determine whether the load on the pug mill motor is too high and whether to add water to obtain a desired moisture level. Preferably, additional water is supplied to the feed mixture through one or more valves that open in response to a control system that receives input signals reflecting indirect moisture measurements.

As used herein, unless otherwise indicated, the term "pressure" generally refers to the air pressure within the relevant part of the system, e.g., the air pressure in the pretreatment chamber or the vacuum chamber, which can also be considered the ambient pressure of that particular local environment, and "pressure" does not refer to a force being applied in a given direction by one solid body on another solid body, e.g., the forces being applied against the feed mixture by the movement of the pug mill, or the forces being applied against the feed mixture by the restrictor plate or the tapered walls of the pretreatment zone.

Preferably, at least one barrier at least partially separates the pretreatment chamber from the mixing chamber, such that the pressure of the feed mixture on the side of the barrier most proximate to the mixing chamber is greater than the pressure of the feed mixture on the side of the barrier most distant from the mixing chamber. Accordingly, in a specific embodiment, a step-wise reduction in pressure from the mixing chamber to the vacuum chamber is provided via the pretreatment zone. Alternatively, this pressure reduction in the pretreatment zone can be continuous, e.g., expressed as a smooth curve, or it can involve a series of "spikes" in pressure, e.g., where the pressure reduction is uneven and even includes upward pressure spikes. Preferably, the step of restricting the flow of the feed mixture in the pretreatment zone includes directing the feed mixture against a barrier which includes apertures through which the feed mixture is capable of passing, such that the momentum of the feed mixture is reduced when it contacts the barrier and passes through the apertures toward the vacuum zone. Preferably, the barrier has a substantially planar surface and at least a portion of the feed mixture is directed against the barrier surface at an angle of about 90 degrees to the barrier surface. Preferably, the flow area is sufficient to prevent substantial amounts of air from entering, i.e., any amount sufficient to raise the pressure of the vacuum zone about 1 bar or greater.

In another aspect, a specific embodiment of the invention is directed to a process of forming an extruded cement-based article, including the steps of: combining and mixing aggregate, binder and a first volume of water in an initial mixing stage to form an initial feed mixture; and adding a second volume of water to the feed mixture in a final mixing stage to form a final feed mixture. Excess water should be present either in the initial feed mixture, before the addition of the second volume of water, or in the final feed mixture, after the addition of the second volume of water, or both. The final feed mixture should then be held in the vacuum zone for a time sufficient to form a densified mixture in the vacuum zone wherein excess water present in the final feed mixture is removed from the densified mixture. The densified mixture should then be directed through an extruder at an elevated pressure to provide an extruded cement-based article. The second volume of water is preferably sufficient to provide excess water to the final feed mixture. Preferably, sufficient vacuum is maintained to remove substantially all of the excess water from the final feed mixture while it is in the vacuum zone.

In yet another aspect, a specific embodiment of the invention is directed to an apparatus for forming an extruded cement-based article, including: a mixing section, including a mixing chamber for mixing a cement-based feed mixture including aggregate, binder and water; a pretreatment section, including a pretreatment chamber for directly or indirectly receiving the feed mixture from the mixing chamber, wherein the feed mixture is densified in the pretreatment section; a vacuum section, including a vacuum chamber for directly or indirectly receiving the feed mixture from the pretreatment chamber, wherein a vacuum is maintained in the vacuum chamber in an amount sufficient to remove entrained air and excess water from the feed mixture and to provide a vacuum-treated mixture; and an extrusion section, including an extruder for directly or indirectly receiving the vacuum-treated mixture from the vacuum chamber and providing an extruded cement-based article. As used herein, the term "entrained air" refers to interstitial air, which might also include air introduced by microbubbles, sometimes added in certain conventional processes.

Preferably, the pretreatment chamber includes a first wall with an entry aperture or opening through which the feed mixture enters the pretreatment chamber and a second wall with an exit aperture or opening through which the feed mixture exits the pretreatment chamber. Preferably, the pretreatment section includes a restrictor to increase the density of the feed mixture. Preferably, the pretreatment section further includes at least one stationary plate with ports through which the feed mixture can flow. The stationary plate being disposed between the first and second walls of the pretreatment chamber. Preferably, the pretreatment section includes at least two stationary plates positioned between the first and second walls of the pretreatment chamber, each plate having ports through which the feed mixture flows, the ports preferably being offset to one another, the stationary plates being separated by a distance of from about 2 to 6 inches. Preferably, at least one of the plates is adjustable such that the relative position of the ports in each plate can be changed (e.g., by being rotated) or the distance between the stationary plates can be adjusted. Preferably, the effective flow area provided by the pretreatment section reduces or controls the flow of the feed mixture in an amount sufficient to prevent an undesirable volume, and preferably a substantial volume, of air present in the feed mixture from entering the vacuum zone. Preferably, the flow area is sufficient to prevent air from entering in an amount that would be sufficient to raise the pressure of the vacuum zone.

In another broad aspect, the invention involves selectively vibrating an extruded cement-based mixture. In a specific embodiment, the invention is directed to a process of forming an extruded cement-based article, which process includes forming a cement-based mixture from starting ingredients that include water, aggregate and hydratable binder and, after hydration of the binder and densification of the mixture, passing the resulting densified mixture through an extruder, a die chamber and a final die, the improvement including the step of selectively vibrating the die chamber to provide substantial effective movement of the die chamber without substantial movement of the extruder or final die. Preferably, the vibrator for selectively vibrating the die chamber includes a motor operably connected to the die chamber for vibrating the die chamber. Preferably, a connector is attached to the die chamber, the connector being driven by a motor, wherein the motor is capable of providing movement to the connector and to the die chamber. Preferably, the die chamber is also flexibly attached to the extrusion conduit such that no substantial vibration movement of the die chamber is transferred to the extrusion conduit. Preferably, the die chamber is flexibly attached to the final die such that no substantial vibration movement of the die chamber is transferred to the final die. Preferably, a compressible member is disposed between the die chamber and the extrusion conduit.

In another specific embodiment, the invention is directed to an apparatus for forming an extruded cement-based article, including: a mixing chamber for mixing the cement-based feed mixture including water, aggregate and binder; a vacuum chamber operably connected to the mixing chamber for directly or indirectly receiving the feed mixture from the mixing chamber and for providing a vacuum-treated mixture; an extrusion conduit operably connected to the vacuum chamber through which the vacuum-treated mixture is directed and extruded to provide an unformed continuous extrudate; a die chamber for directly or indirectly receiving the vacuum-treated mixture, the die chamber having a first opening operably connecting the extrusion conduit to the die chamber, a second opening operably connecting the die chamber to a die, and inwardly slanting walls such that the internal diameter of the die chamber is larger proximate the first opening than the internal diameter of the die chamber proximate the second opening; a vibrator for selectively vibrating the die chamber to provide substantial movement of the die chamber, movement being in a direction substantially perpendicular to the direction of the unformed continuous extrudate, without providing substantial movement to the extrusion conduit; and a final die operably connected to the die chamber for providing a formed extruded article.

In another aspect, the invention is also directed to a process of forming an extruded cement-based article, including the steps of: forming a cement-based mixture including water, aggregate and binder; directing the mixture through an extrusion zone at an elevated pressure to form a continuous unformed extrudate; directing the unformed extrudate directly or indirectly from the extrusion zone to a transition zone and through the transition zone, the transition zone having a die chamber; selectively vibrating the die chamber without vibration of the extrusion zone; and directing the second mixture from the transition zone to a die and through the die to form an extruded cement-based article.

Another specific embodiment of the invention is directed to a process of forming an extruded cement-based article, including the steps of: forming a cement-based feed mixture including water, aggregate and binder; directing the feed mixture to a vacuum zone, wherein sufficient vacuum is maintained in the vacuum zone to remove entrained air and excess water from the feed mixture; holding the feed mixture in the vacuum zone for a time sufficient to form a vacuum-treated mixture; directing the vacuum-treated mixture through an extruder at an elevated pressure, wherein the extruder includes an extrusion conduit and means for propelling the vacuum-treated mixture through the extrusion conduit to provide an unformed continuous extrudate; directing the unformed continuous extrudate to a die chamber having a first opening operably connecting the extrusion conduit to the die chamber, a second opening operably connecting the die chamber to a die, and inwardly slanting walls such that the internal diameter of the die chamber is larger proximate the first opening than the internal diameter of the die chamber proximate the second opening; selectively vibrating the die chamber to provide substantial movement of the die chamber, said movement being in a direction substantially perpendicular to the direction of the unformed continuous extrudate, without providing substantial movement to the extrusion conduit; directing the unformed continuous extrudate through the selectively vibrating die chamber; and directing the unformed continuous extrudate through a final die to provide a formed extruded article.

BRIEF DESCRIPTION OF THE DRAWINGS

FIG. 7 is a front view of a core bar.

FIG. 8 is a side view of a die chamber including a continuous filament feeding feature.

DETAILED DESCRIPTION

Figure 1:
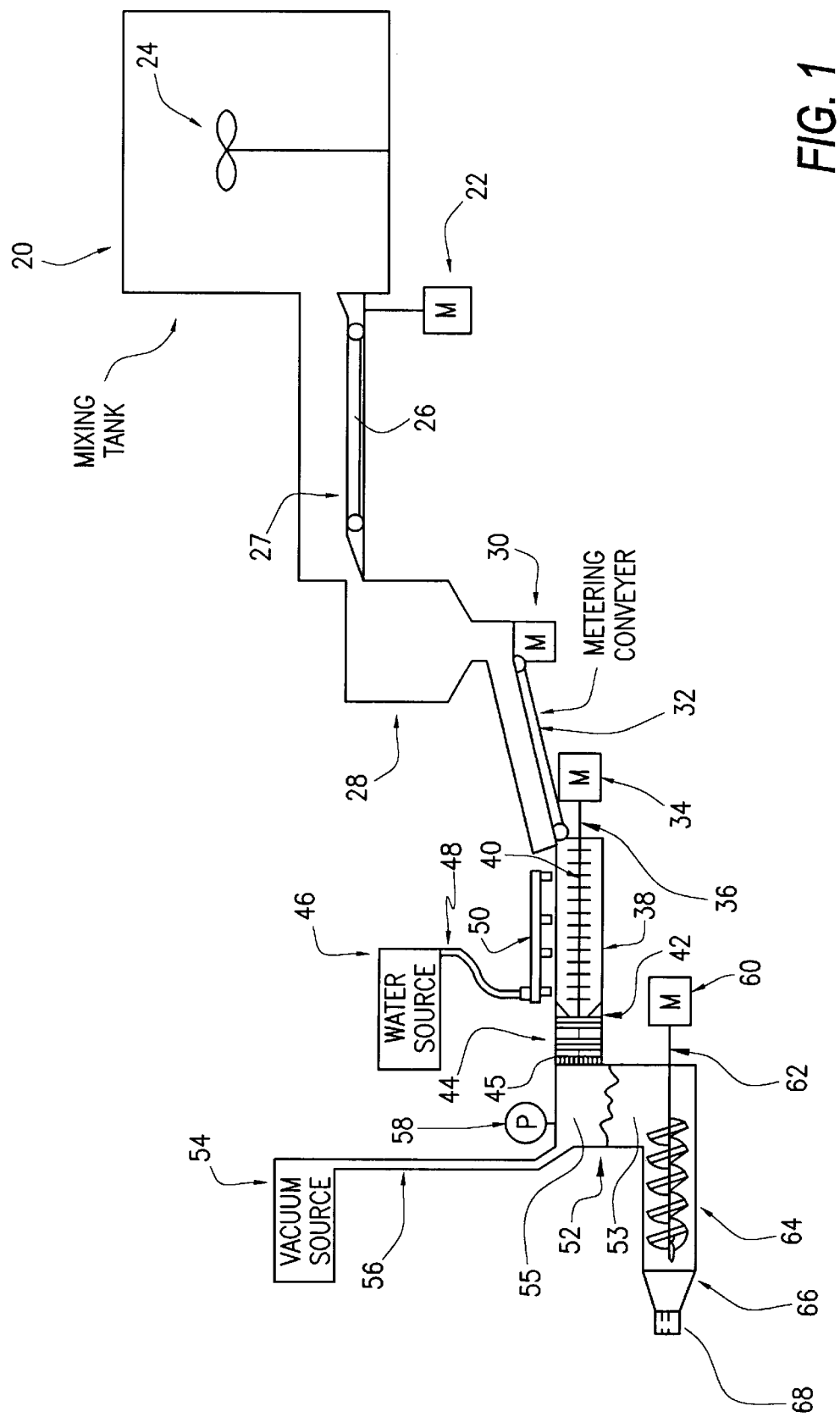
FIG. 1 is a side view of an overall process and apparatus representing a specific embodiment of the invention.

The following discusses details and other aspects and features of the invention, including specific embodiments of the invention. As summarized above, in one broad aspect, the invention is directed to a process of forming an extruded cement-based article. Broadly, the process includes the steps of: (a) forming a cement-based feed mixture including water, aggregate and binder; (b) directing the feed mixture to a vacuum zone, wherein sufficient vacuum is maintained in the vacuum zone to remove entrained air and, preferably, excess water, from the feed mixture; (c) holding the feed mixture in the vacuum zone at a negative pressure for a time sufficient to form a vacuum-treated or densified mixture; and (d) directing the vacuum-treated or densified mixture through an extruder at an elevated pressure to provide an extruded cement-based article.

A. Mixing

One of the steps of the invention involves forming the feed mixture, which is preferably done by mixing the ingredients or components together as a "batch" in a single mixing vessel. Although the mixing is preferably done mechanically, it is understood that manual mixing is also included. The feed mixture includes at least a binder, aggregate and water, which are preferably initially mixed in a mixing tank where the feed mixture is prepared and mixed using a mixing propeller. Then the feed mixture is preferably directed by feed conveyor to a hopper, which controls the flow rate of the feed mixture. The feed mixture can then be conveyed by a metering conveyor to another mixing device, e.g., a pug mill, where the feed mixture is mixed more thoroughly and directed toward the vacuum zone. Preferably, the pug mill has mixing blades that are pitched forward for advancing the feed mixture toward the vacuum zone. Alternatively, the feed mixture can be directed by a conventional auger-type extruder (not shown) to the vacuum zone. Large scale extruders such as the Plymouth Special Type PH, are available from Plymouth Locomotive International Inc. Smaller 20-HP extruders, for very small-scale operations, e.g., for laboratory settings, are available from J. C. Steele & Sons, in Statesville N.C. Extruders may also be available from Frecon Ceramics, Inc. and from EEI Premier.

One of the essential ingredients of the cement-based feed mixture is a binder, sometimes referred to in the industry as a "hydraulically settable binder." It is also sometimes referred to as "concrete." The binders of the invention are preferably inorganic materials that strengthen upon reaction with water, i.e., upon hydration. As used herein, the term "binder" broadly includes not only the starting material, i.e., the hydratable particulate matter that is initially combined with the water and aggregate, and that is not yet hydrated, but also the hydrated binder, i.e., the material after hydration has occurred, either partially or completely. Thus, it includes what some refer to as "hydraulic paste." Binders are well-known and will not be listed in exhaustive fashion. However, some examples of binders include cement (particularly portland cement), gypsum, calcium oxide and flyash, or mixtures thereof. Others are disclosed in U.S. Pat. No. 5,549,859 and the disclosure relating to binders in that patent is incorporated by reference.

The amount of binder used in the feed mixture can be varied, depending largely on the nature of the extruded product being produced. Broadly, the binder should be present in the feed mixture in the amount of from about 10 to 90 wt %. More narrowly, the binder should be present in the feed mixture in the amount of from about 35 to 80 wt %. Still more narrowly, the binder can be present in the feed mixture in the amount of from about 35 to 50 wt %. Examples of specific compositions are discussed below.

Another essential ingredient is "aggregate," which is also an industry-recognized term that refers broadly to any collection of rigid or semi-rigid particles in the feed mixture such as sand, gravel, or even clay. Generally, as used herein, the aggregate of this invention is a material that does not itself hydrate or react, unlike the binder. Broadly, in this invention, the aggregate should be present in the feed mixture in the amount of from about 10 to 80 wt %. More narrowly, the aggregate can be present in the feed mixture in the amount of from about 20 to 65 wt %. Still more narrowly, the aggregate can be present in the feed mixture in the amount of from about 40 to 60 wt %.

Another important ingredient is water, which, broadly speaking, can be present in the feed mixture in the amount of from about 2 to 20 wt %. As discussed below, it is helpful but not necessarily critical for the water to be added during initial mixing. The water can be present in the feed mixture in the amount of from about 4 to 12 wt %. Still more narrowly, the water can be present in the feed mixture in the amount of from about 4 to 8 wt %. In a preferred aspect of the invention, water is added in an amount sufficient to provide "excess water" to the mixture before pressure is applied in the extruder and even more preferably before the vacuum step.

Other ingredients that can be added to the feed mixture include one or more plasticizers, stabilizers, dyes, or pigments, alone or in combination. Still other ingredients include continuous and discontinuous fibers.

B. Pretreatment

In a specific embodiment of the invention, a feed mixture is directed through a pretreatment zone. As used herein, the term "pretreatment zone" refers broadly to the part of the process and apparatus after mixing, e.g., mixing in the pug mill, and before vacuum is applied, e.g., after all water addition and substantial mixing has occurred. Broadly, the feed mixture undergoes densification in the pretreatment zone. This densification is different from the densification occurring further downstream in the process, during the vacuum stage. Although the pretreatment zone preferably includes a separate chamber, including a restrictor plate, as shown herein in a specific embodiment of the invention, it can also include at least a portion of the mixing chamber, preferably at the point where mixing of the feed mixture is substantially completed. For example, a pug mill chamber can be sufficiently tapered at a downstream point, so that the tapered portion functions as a pretreatment zone. In the pretreatment zone, the feed mixture is prepared for vacuum treatment. Preferably, in the pretreatment zone, the flow of the feed mixture is restricted in an amount at least sufficient to increase the "particle packing," or density, of the particulate feed mixture, preferably, so that a "plug" is formed from the feed mixture. As will be discussed in greater detail below, the pretreatment zone should preferably include some means, most preferably the specific structures disclosed below, for creating and applying a force or forces in the opposite direction of the feed mixture movement, that will counterbalance the suction forces generated in the vacuum zone, e.g., the vacuum chamber. This balancing of forces is shown conceptually in FIG. 11, discussed again below.

In a specific embodiment, the feed mixture enters the pretreatment zone from a mixing zone and exits the pretreatment zone to the vacuum zone. Preferably, in a specific embodiment, the pretreatment zone includes a pretreatment chamber, more preferably, one that is tapered. The mixing chamber can also be tapered, e.g., at the end proximate the pretreatment chamber, so that the pretreatment zone is partially or wholly within the mixing chamber. Preferably, a pug mill is utilized for the mixing device, with a pug mill chamber having a tapered end; however, depending on the dimensions and structure of the overall system, including particularly the dimensions of and pressure levels within the vacuum chamber, and also depending on the composition and properties of the feed mixture, densified mixture and final extruded article, an additional pretreatment chamber, e.g., one that is tapered and has a restrictor plate, is preferably included, as one of the modifications to a conventional pug mill.

In another specific embodiment, the step of restricting the flow of the feed mixture in a pretreatment zone includes directing the feed mixture against a barrier which is preferably a structure that includes apertures through which the feed mixture is capable of passing when a force is applied to the mixture, e.g., a force in the direction of the flow, e.g., by the action of a pug mill, such that the volume flow rate of the feed mixture is reduced after it initially contacts the barrier, which creates an opposing force, e.g., a force in the opposite direction as the direction of the flow, after which it passes through the apertures toward the vacuum zone. Preferably, the volume flow rate of the feed mixture is decreased (because the material is being densified), even though the overall mass flow rate remains constant, following conservation of mass principles. Preferably, the barrier has a substantially planar surface, and the feed mixture is directed against the barrier surface at an angle of between about 45 to 90 degrees to the barrier surface, and, more preferably, about 90 degrees to the barrier surface, i.e., perpendicularly. Preferably, after initially contacting the barrier surface, at least a portion of the feed mixture changes direction and first moves parallel to the barrier surface and then changes direction again to pass perpendicular to the barrier through the apertures of the barrier toward the vacuum zone. Preferably, the barrier is in or forms part of the pretreatment zone. Although the pretreatment zone is preferably defined by a pretreatment chamber that is separate from the mixing chamber, the pretreatment zone can also be part of the mixing chamber, i.e., as a part of the chamber containing the pug mill.

In a specific embodiment, the step of restricting the flow rate of the feed mixture in the pretreatment zone includes passing the feed mixture through at least two sets of apertures to reduce the flow rate of the feed mixture entering the vacuum zone. These sets of apertures can be separate groups of apertures formed in separate structures where at least two sets or groups of apertures are in different planes relative to the direction of movement of the mixture.

As discussed above, another specific embodiment of the invention involves the use or incorporation of a shredder. The shredder is preferably part of the vacuum zone, and the material should be shredded at least before any substantial hydration has occurred, e.g., at the entrance to the vacuum chamber although some hydration will typically begin prior to shredding, and it is contemplated that some hydration will also begin to occur even during the mixing step, e.g., while the feed mixture is still in the pug mill. In a specific embodiment, the feed mixture is shredded by passing the feed mixture through a multiple-blade rotary shredder. Preferably, the feed mixture is shredded after the feed mixture has been restricted or densified, and more preferably after it has passed completely through the pretreatment zone, e.g., by passing through the barrier.

Another specific embodiment of the invention includes an apparatus for forming an extruded cement-based article, which includes a pretreatment section. Broadly, the pretreatment section includes at least a tapered conduit or chamber, for example, such that a mixture becomes densified as it passes from the large diameter end of the conduit to the small diameter end. In one broad aspect, the apparatus includes: a mixing section having a mixing chamber for mixing a cement-based feed mixture which includes aggregate, binder and water; a pretreatment section, which may include a separate pretreatment chamber for directly or indirectly receiving the feed mixture from the mixing chamber at a first volume flow rate, preferably having at least one barrier to separate the pretreatment chamber from the mixing chamber; a vacuum section, having a vacuum chamber for directly or indirectly receiving the feed mixture from the pretreatment chamber at the second volume flow rate, wherein a vacuum is maintained in the vacuum chamber in an amount, i.e., at a level, sufficient to remove a desired amount of entrained air and excess water from the feed mixture and to provide a densified or vacuum-treated mixture; and an extrusion section, including an extruder for directly or indirectly receiving the densified or vacuum-treated mixture from the vacuum chamber and providing an extruded cement-based article. The vacuum zone preferably includes a shredder, which is preferably positioned relatively close to the pretreatment zone, and is more preferably positioned closer to the pretreatment zone than to the extrusion zone, and is even more preferably positioned at the entrance to the vacuum zone, e.g., so that the mixture passes through the shredder immediately after it exits the pretreatment zone.

The pretreatment section or zone preferably provides an effective flow area for the passage of the feed mixture. As used herein, the term "effective flow area" is defined as the total cross-sectional area of the most restrictive point through which the feed mixture passes when moving from the mixing zone, e.g., the mixing chamber, to the vacuum zone, e.g., the vacuum chamber. Preferably, the volume flow rate of the feed mixture in the process is determined by the effective flow area, which acts as a "pinch point." The effective flow area can also be considered one of the "rate-determining variables." Preferably, the effective flow area of the pretreatment section reduces the volume flow rate of the feed mixture so as to provide a balance or equilibrium of forces between the vacuum section and the mixing section. According to this preferred embodiment of the invention, the feed mixture is initially granular and not substantially cohesive. It typically does not achieve the desired level of cohesiveness until some point during the vacuum step, where densification occurs (not including some densification that can occur in the pretreatment zone, prior to substantial cohesion). After the feed mixture is mixed but before it has become substantially cohesive, it tends to be "pulled" by the vacuum, i.e., by the sucking action due to the negative pressure in the vacuum zone. This pulling or sucking action may tend to bring unwanted air into the vacuum chamber, e.g., air that is entrained in the feed mixture. This entry of unwanted air can sometimes change the desired vacuum level causing an unwanted pressure imbalance and disruption in the vacuum zone.

Figure 10:
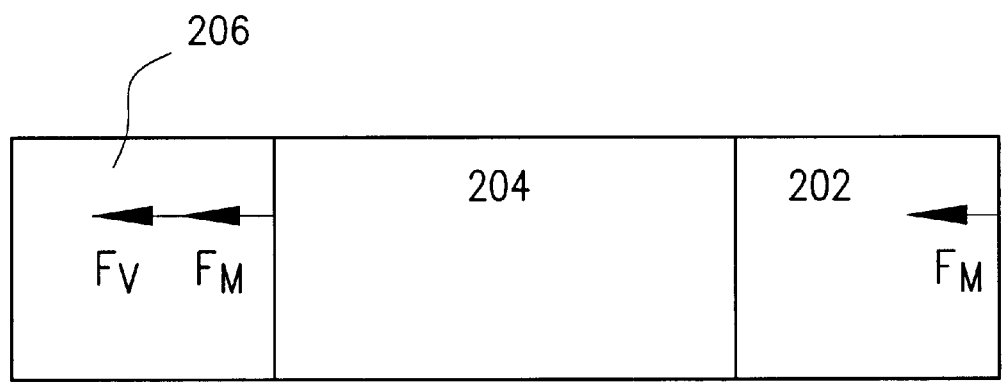
FIG. 10 is a conceptual force vector diagram showing the balancing of forces within a system not having a pretreatment zone.
Figure 11:
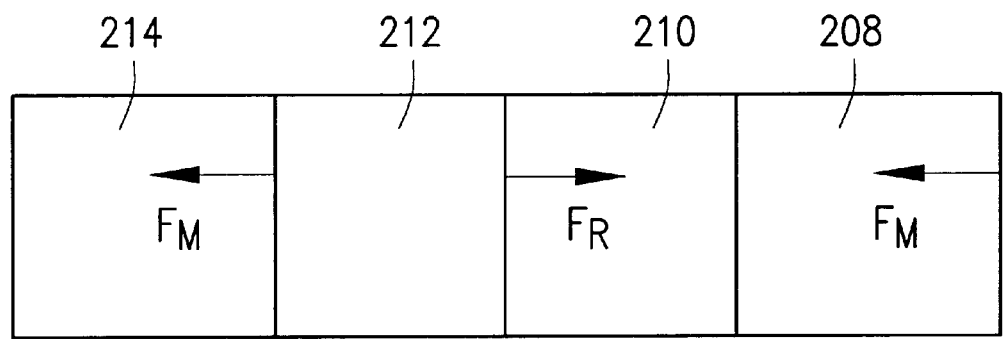
FIG. 11 is a conceptual force vector diagram showing the balancing of forces within a system having a pretreatment zone.

According to a preferred embodiment of the invention, the pretreatment zone is designed or configured to balance the suction generated by the negative pressure or vacuum in the vacuum zone. That is, the structure and dimensions of the pretreatment zone should correspond to the desired pressure level in the vacuum zone, specifically, by balancing the suction forces generated by the vacuum in the vacuum zone, preferably such that substantially no air enters the vacuum zone during a mixing, vacuum and extrusion operation, e.g., an amount of air sufficient to cause the pressure in the vacuum zone to increase by more than a set amount, e.g., 1 bar. The conceptual diagrams of FIG. 10 and FIG. 11 show this balancing of forces. FIG. 10 shows a system without the pretreatment zone of this invention. FIG. 11 shows a system having a pretreatment zone.

FIG. 10 represents a simplified illustration of horizontal forces that could be said to be acting on a feed mixture as the mixture passes through from the mixing zone to the vacuum zone, where there is no pretreatment zone in between, e.g., no effective barrier nor effective tapered conduit in the area between the two zones. At point 202 within the mixing zone, the force vector $F_M$ can be considered to correspond to the sum of the forces acting on the feed mixture as it leaves a pug mill, which drives the feed mixture toward the vacuum zone, and presumably supplies most if not all of the forces represented by force vector $F_M$. By the time the mixture reaches a point 206, where it is being acted on by the force of the vacuum, it is seen that additional forces are applied, particularly the suction forces supplied by the vacuum, as represented by force vector $F_V$. In FIG. 10, it is seen that no counterbalancing forces act on the material, other than perhaps negligible friction forces. In approximate terms, the additive nature of these forces ($F_V+F_M$) can create an undesirable effect on the feed mixture itself, including the pulling of unwanted air into the vacuum zone.

In contrast, in FIG. 11, demonstrating a specific embodiment of the present invention, show how horizontal forces can act on the feed mixture as it passes through from the mixing zone to a pretreatment zone and then to a vacuum zone, passing through areas with reference nos. 208, 210, 212 and 214. As shown in FIG. 11, a sum of the restrictive forces ($F_R$) may be provided by, e.g., a barrier or tapered conduit, and is applied in the direction against the flow the feed mixture, i.e., in the opposite direction as the other forces $F_M$ and $F_V$. In accordance with a specific embodiment, the restrictive forces $F_R$ can be at least sufficient to cancel out the forces supplied by the vacuum, so that the net forces acting on the feed mixture is the same as $F_M$, i.e., the forces supplied by the mixing device, e.g., the pug mill. As contemplated by the inventor, in a specific embodiment of the invention, one convenient way to measure whether proper balancing exists is to ensure that the vacuum level in the vacuum chamber does not vary by more than a predetermined level, e.g., about 1 bar, during extrusion operations. If so, and if the increase in pressure within the vacuum zone is caused by the suction of entrained air, then modifications may have to be made to the pretreatment zone to properly balance out the forces.

A number of different types of structure and configurations can be provided to accomplish this balancing of forces, including having a pug mill chamber with sufficient tapering to provide the restrictive forces. For illustrative purposes and not by way of limitation, other specific embodiments of this invention are shown in FIGS. 12 and 13.

Figure 12:
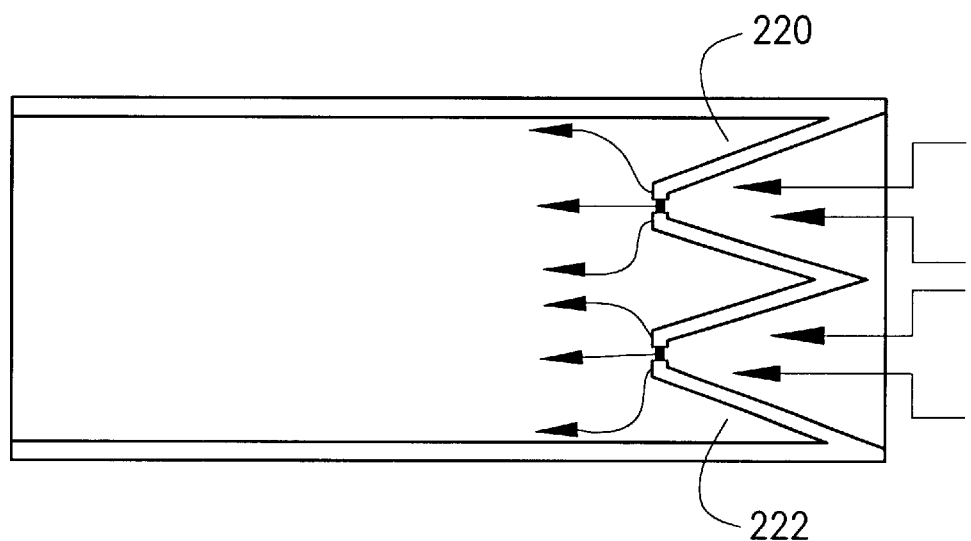
FIG. 12 is a cutaway side view of a pretreatment chamber that includes a plurality of tapered conduits or funnels.

As shown in FIG. 12, a pretreatment zone can include a plurality of tapered conduits 220, 222, providing for a funneling of the feed mixture (signified by arrows) through the tapered conduits. While only two are shown in FIG. 12, the number of tapered conduits can be more than two. Also, while the tapered conduits in FIG. 12 are cylindrical, i.e., funnel-shaped, they can also be shaped in a number of other ways. For example, the tapered conduits can have squared sides. Further, the tapered conduits can be arranged in a variety of ways, to accomplish the desired function. For example, a pretreatment zone can include a barrier having a large number of small funnel-shaped tapered conduits arranged in a circle (not shown), each individual conduit having a butterfly-type valve so as to selectively close that particular conduit, thus providing a way to control the flow rate of the feed mixture, as well as provide restrictive forces to counterbalance the suction forces, as discussed above.

Figure 13:
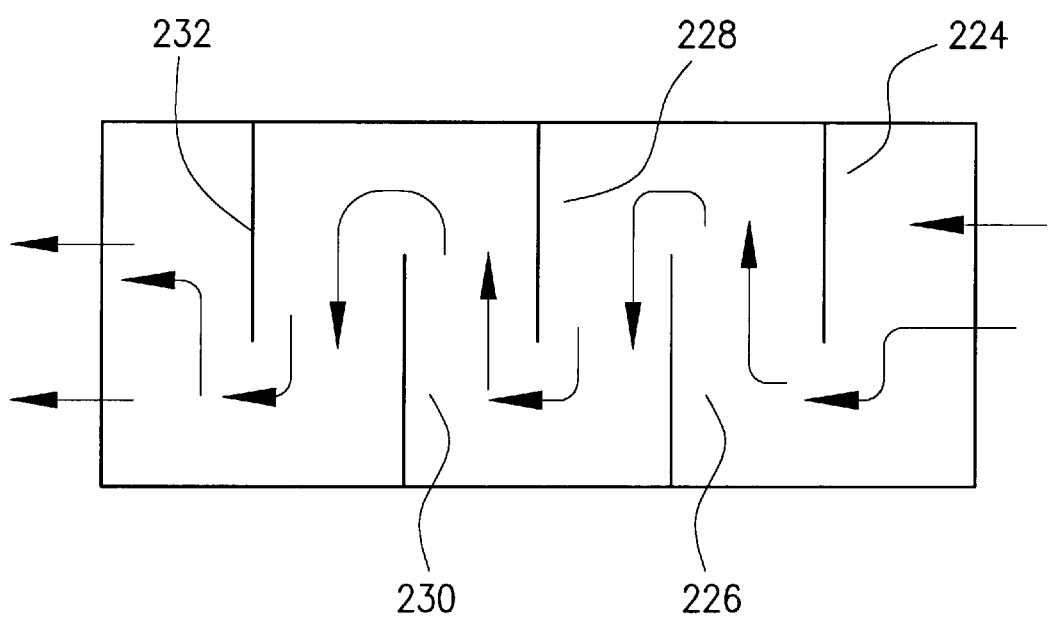
FIG. 13 is a cutaway side view of a pretreatment chamber that includes a series of baffles.

In another specific embodiment, as shown in FIG. 13, the pretreatment zone includes a system of baffles 224, 226, 228, 230, 232, sized, arranged and spaced to provide for the desired passage of feed mixture (shown by arrows). Note, however, that while the baffles may provide the desired balance to the suction forces generated by the vacuum zone, it is not known whether the system of baffles provide for densification, if any is desired.

Broadly, as disclosed elsewhere in this patent, the restrictive forces in the pretreatment zone can be provided by one or more restrictor plates or even by some other barrier. It is contemplated that providing the exact or proper balancing will depend largely on a number of factors, including the level of vacuum, the flow rate of the feed mixture and the dimensions of the various chambers, including the pretreatment chamber. It is contemplated that an advantage of using adjustable restrictor plates, or using replaceable restrictor plates having different aperture sizes and/or port arrangements, is that adjustments can be made to the restrictive forces without requiring substantial structural changes. Further, although it is preferred that the restrictive forces $F_R$ balance out the vacuum forces $F_V$, and the inventor contemplates designing the system to accomplish that, it is contemplated that the balancing can less than perfect.

In a specific embodiment of this invention, the apparatus has a pretreatment chamber which includes a first wall with an entry aperture through which the feed mixture enters the pretreatment chamber and a second wall with an exit aperture through which the feed mixture exits the pretreatment chamber. In a certain embodiment, the first and second walls, together with the sidewalls, define the outer boundary of the pretreatment chamber. The pretreatment section preferably also includes at least one stationary plate with ports through which the feed mixture flows, the stationary plate being disposed between the first and second walls of the pretreatment chamber. Preferably, the pretreatment section includes at least two stationary plates positioned between the first and second walls of the pretreatment chamber, each plate having ports through which the feed mixture flows, the ports being offset to one another, where the two stationary plates are separated by a distance of from about 2 to 6 inches, preferably about 4 inches. Also, at least one of the plates can be adjustable such that the relative position of the ports in each plate can be changed or the distance between the stationary plates can be altered.

C. Vacuum

An important part of a specific embodiment of this invention involves placing the feed mixture in a vacuum zone. As used herein, the term "vacuum" refers broadly to a negative pressure environment, which may be created by pulling a suction from an enclosed chamber that is preferably sealed. Generally, the use of a vacuum results in the removal of moisture and air from the mixture, which results in a higher density material. The vacuum in the vacuum zone should be sufficient to remove any excess water that is present in the feed mixture. Preferably, the vacuum in the vacuum zone is maintained at a pressure level of down to about −29 bars. Still more narrowly, the vacuum in the vacuum zone should be maintained at a pressure level within the range of from about −5 to −29 bars. More narrowly, the vacuum in the vacuum zone is maintained at a pressure level of from about −5 to −15 bars. A preferred vacuum pressure level is about −10 bars. The vacuum zone should be substantially sealed so as to maintain the desired level of vacuum within the vacuum zone. This can be accomplished by the use of a tapered pretreatment or mixing chamber, which forms a "plug seal" at the entrance of the vacuum chamber. The vacuum chamber can have an exit opening, preferably one that leads to the extruder, which includes an extrusion conduit and some movement generator such an auger or screw conveyor. The vacuum in the vacuum chamber is maintained by the presence of the vacuum treated mixture in the extrusion conduit, which effectively forms a seal. Also, at one end of the conduit or conveyor is a sealing member, which preferably includes a tapered head. In a specific embodiment, the sealing member also includes a die chamber, which is also preferably tapered. The vacuum treatment of the above described process results in removal of entrained air and, preferably, excess water. Preferably, the vacuum-treated mixture becomes "densified" having a density within the range of from about 50 to 200 lbs/ft$^3$. More narrowly, the vacuum-treated mixture has a density within the range of from about 85 to 150 lbs/ft$^3$. Even more narrowly, the vacuum-treated mixture has a density within the range of from about 90 to 105 lbs/ft$^3$.

In accordance with certain aspects of this invention, the controlling of the pressure levels, i.e., the vacuum levels, within the vacuum zone, also controls, affects, or determines (along with other factors) certain properties of the final extruded product. For example, it is contemplated that forming an extruded article using a vacuum level of from about −15 to −29 bars will generate a high-density extruded concrete product with substantially no entrained air. When an extruded article is manufactured using a vacuum of −5 to −15 bars, the article will include moderate amounts of entrained air, which generally provides it with acceptable freeze thaw characteristics and a density of from about 105 to 150 lbs/ft$^3$. Maintaining a vacuum of from about 0 to −5 bars will generally provide an unacceptably low density concrete.

D. Moisture Control

Another specific embodiment of this invention relates to a moisture control feature, preferably one that includes indirectly measuring moisture by measuring or otherwise determining the thickness (i.e., viscosity) of the material being measured. Broadly, this embodiment is directed to a process for forming an extruded cement-based article that includes: mixing a feed mixture (water, binder and aggregate); densifying the feed mixture to form a densified cement-based material; and extruding the densified material to form an extruded cement-based article. In a broad aspect, the moisture control feature includes the steps of measuring the thickness of the feed mixture during mixing, comparing the measured thickness of the feed mixture with a reference value; and adding water to the feed mixture in response to the comparison between the measured thickness and the reference value. As discussed below, a mixing motor (e.g., to drive a pug mill) can be used to mix the feed mixture and the step of measuring the thickness of the feed mixture can include measuring the load on the mixing motor. Also, an extruder motor can be used to extrude the densified material, so that the "reference value" can be based on the load on the extruder motor during extrusion. More specifically, the comparison between the measured thickness of the feed mixture and the reference value can include a comparison between the load acting on the mixing motor and the load acting on the extruder motor.

The "predetermined reference level" will necessarily depend on the equipment being used and the desired properties for the final extruded article. The term "reference value" or "reference lever" as used herein refers typically to a number, value or quantity. Either it can be an absolute or set number, e.g., one that is predetermined and does not vary during or between processes, or it can be a variable number. For example, where the reference value or level is the measured load on the extruder motor, a decision might be made to fabricate a different article with different properties but using the same feed mixture. Or, the operator may decide to make an adjustment to the properties of the final extruded article. In such cases, the speed of the extruder motor might be adjusted, thus the load on the extruder motor would also change. This change in extruder load would thus constitute a change in the reference value or level for the purpose of determining the proper moisture content in the feed mixture during mixing. Thus, a contemplated advantage of this specific embodiment of the invention is that a variety of changes can be made in the extrusion step, and, using feedback principles, these changes can be incorporated into moisture level settings during the mixing stage.

The embodiment of this invention involving a process in which the loads on the mixing and extruder motors are compared can include the use of a conventional feedback algorithm, for example, wherein a processor or other control system preferably having appropriate software or other circuitry continuously or periodically receives an "extruder signal" from the extruder motor that corresponds to the load on the extruder motor, e.g., in amps; and also receives a "mixer signal" from the mixing motor that corresponds to the load on the mixing motor, e.g., in amps; then compares the two signals to determine whether additional water needs to be added to the feed mixture. Software, available from Frecon Ceramics for use with the Frecon Moisture Control Unit Series 200, can be modified for implementation in accordance with the present invention, e.g., by using a set of the Frecon software for each motor (mixing motor and extruder motor) and then writing a "patch" software program to correlate the two motors for control purposes in accordance with this invention.

In another specific embodiment the process of this invention includes an indirect moisture measurement feature. Preferably, the process includes the step of measuring the moisture level of the feed mixture after the addition of water to determine whether additional water is to be added. In accordance with this invention, the moisture level can be measured indirectly. For example, the moisture level can be measured by measuring the viscosity or thickness of the feed mixture in the mixing chamber, before the feed mixture is directed to the vacuum zone. The measured viscosity or thickness can be compared to a predetermined reference viscosity or thickness which is or has been correlated with a desired moisture level. Preferably, the process includes the additional step of adding water based on the results of the comparison. Preferably, water is added to lower the viscosity or thickness when the comparison shows that the measured viscosity or thickness is too high. Where the feed mixture is mixed using a pug mill with a mixing shaft driven by a motor, the viscosity or thickness of the feed mixture can be measured by measuring the load on the motor driving the pug mill shaft. If the load on the pug mill motor is too high, such that it is above a predetermined reference level, then the viscosity should be considered to be too high, and the moisture level too low, whereupon water can be added in proportion to the difference between the measured load and the reference load. Where the vacuum-treated mixture is extruded in an extruder that includes an extruder shaft driven by an extruder motor, the load on the pug mill motor can be compared to the load on the extruder motor to determine whether the load on the pug mill motor is too high and whether to add water to obtain a desired moisture level. Based on the indirect measurement, water can be added. For example, if the measured viscosity is too high, then water is added to lower the viscosity. The measured viscosity should not be lower than the reference viscosity. (Because it is practically impossible to remove moisture from the mixture.)

In a preferred embodiment of the invention, the viscosity is measured (and moisture level thus indirectly measured) by measuring the load (in amps) on the motor that is driving the pug mill shaft. In accordance with the invention, if the load on the pug mill motor is too high, i.e., above a predetermined reference level, then inferentially the viscosity is considered to be too high and the moisture level too low. Water is then added in proportion to the difference between the measured load and the reference load. Alternatively, the load on the pug mill motor can be compared to the load on the extruder motor. That is, the load on the extruder motor can be used as a reference value for determining whether the load on the pug mill motor is too high. Assume, for example, that when the feed mixture is at a proper moisture level, the load on the pug mill is about 0.25 times the load on the extruder motor. If the load on the pug mill changes so that it is 0.30 times the load on the extruder motor, then inferentially the feed mixture in the pug mill is too viscous and thick, indicating that water needs to be added in an amount sufficient to bring the load back down to the reference value, i.e., 0.25 times the extruder load.

In a specific embodiment of the invention, additional water is supplied to the feed mixture through one or more valves that open in response to a control system that receives input signals reflecting indirect moisture measurements. In a specific embodiment (shown in drawings), a water supply provides the water for supplying the moisture, and is connected by tubes, pipes or some other conduit to a piping manifold, where water is distributed to individual water dispensers, each having separate valves. Each of the valves is preferably controlled by a "controller," i.e., some control system, which in one embodiment receives at least one set of input signals from the pug mill motor indicating the load acting on the motor, and may also receive another set of input signals from the main auger motor indicating the load acting on that motor. Preferably, the controller uses or incorporates software that uses an algorithm that compares the indirect viscosity measurements with a reference value, as discussed above. Preferably, after determining the appropriate volume of water needed to be added (collectively or at each dispenser), the controller sends output signals to one or more selected valves, which open accordingly and dispense the desired volume of water, resulting in increased moisture levels for the feed mixture. Although the system shown in the drawings is preferred, other configurations can also be used.

E. Excess Water

In a broad aspect, the invention is directed to a process of forming an extruded cement-based article that is based on the use of excess water. As used herein, the term "excess water" means water that is neither used in hydration or other reaction by the hydratable binder, nor absorbed by the aggregate or other ingredients. That is, the excess water is "free water." In a preferred embodiment, the process includes the steps of: (a) combining and mixing aggregate, hydratable binder and a first volume of water in an initial mixing stage to form an initial feed mixture; (b) adding a second volume of water to the feed mixture in a final mixing stage to form a final feed mixture, wherein excess water is present either in the initial feed mixture, before the addition of the second volume of water, or in the final feed mixture after the addition of the second volume of water, or both; (c) holding the final feed mixture in the vacuum zone for a time sufficient to form a vacuum-treated mixture wherein some, substantially all, or all of the excess water present in the final feed mixture is removed from the vacuum-treated mixture; and (d) directing the vacuum-treated mixture through an extruder at an elevated pressure to provide an extruded cement-based article. For example, the first volume of water can be about 2 wt % and the second volume of water can be about 4 to 8 wt %.

In a specific embodiment, the first volume of water is sufficient to provide excess water to the initial feed mixture. In another specific embodiment, where the first volume of water does not provide excess water, the second volume of water is sufficient to provide excess water to the final feed mixture. More specifically, for example, where a paving stone is being fabricated, the first and second volumes of added water can be sufficient to provide a final feed mixture with a moisture content of anywhere from about 2 to 20 wt % water. In another specific embodiment, the added water is sufficient to provide a moisture content of from about 4 to 12 wt %. Still more specifically, the added water should be sufficient to provide a moisture content of from about 4 to 8 wt %. Preferably, sufficient vacuum is maintained to remove substantially all of the excess water from the final feed mixture while it is in the vacuum zone.

F. Extrusion

Another important part of the invention is extrusion, which as discussed herein, occurs after the vacuum stage. As used herein, the term "extrusion zone" broadly means the part of the process or the apparatus after or downstream of the vacuum zone, including the final die section, where the extruded product is delivered. The term "transition zone" is used herein to refer to a part or subset of the extrusion zone, and is located upstream of the final die section. Preferably, the "die chamber" forms at least part of the transition zone. As discussed herein, as part of the extrusion process, the densified vacuum-treated mixture is subjected to an elevated pressure, i.e., a positive pressure. Preferably, the elevated pressure applied to the vacuum-treated mixture is from 1 to about 5,000 psi. More preferably, the elevated pressure applied to the vacuum-treated mixture is from about 50 to about 2,000 psi. Still more preferably, the elevated pressure is more narrowly from about 300 psi to 1,500 psi. The desired extrusion pressure is preferably provided by applying force against the vacuum-treated mixture, e.g., by an auger extruder driver by a motor.

G. Selective Vibration

Yet another specific embodiment of the invention involves the use of what is referred to herein as "selective vibration." That is, an apparatus embodying the invention preferably includes a vibrator for selectively vibrating the die chamber. The vibrator can include a motor that is operably connected to the die chamber for vibrating the die chamber. The vibration generating device for selectively vibrating the die chamber can include a connector attached to the die chamber, e.g., a connecting arm. The connector can be driven by a motor, wherein the motor is capable of providing movement to the connector and to the die chamber. Alternatively, the vibrator can be any motion-generating device attached directly or indirectly to the die chamber. It can even be a type of vibration device that is attached to or forms part of the die chamber itself. (Not shown.)

The vibration should be "selective." That is, for example, the die chamber should be flexibly attached to the extrusion conduit and should be flexible at least to the extent that no substantial vibration movement of the die chamber is transferred to the extrusion conduit. The die chamber should also be flexibly attached to the final die such that no substantial vibration movement of the die chamber is transferred to the final die. Also, the die chamber, extrusion conduit and final die should be sealed at the flexible attachment between them to prevent ingress of air. One way to provide sealing and flexibility is to use components or structures that behave much like both seals and shock absorbers. For example, a shock absorbing or compressible member can be disposed between the die chamber and the extrusion conduit and/or between the die chamber and final die. That shock absorbing or compressible member is preferably made of or at least includes a rubber-like or thermoplastic material, preferably a ultrhigh molecular weight (UHMW) plastic. The shock absorbing or compressible member disposed between the die chamber and the final die is preferably a silicon or teflon coating, or an o-ring or gasket-type structure made of a conventional ultrahigh molecular weight (UHMW). It is also contemplated that the shock absorbing or compressible member on either side of the die chamber can also include a metal or plastic spring (not shown).

In another specific aspect, the invention can include a process of forming an extruded cement-based article, which includes the steps of: forming a cement-based mixture including water, aggregate and binder, directing the mixture through an extrusion zone at an elevated pressure to form a continuous unformed extrudate; directing the unformed extrudate directly or indirectly from the extrusion zone to a transition zone and through the transition zone, the transition zone having a die chamber; selectively vibrating the die chamber without substantial vibration of the extrusion zone; and directing the second mixture from the transition zone to a die and through the final die to form an extruded cement-based article.

In yet another specific embodiment, the invention includes a process of forming an extruded cement-based article, including the steps of: (a) forming a cement-based feed mixture that includes water, aggregate and hydratable binder; (b) directing the feed mixture to a vacuum zone, wherein sufficient vacuum is maintained in the vacuum zone to remove entrained air and preferably excess water from the feed mixture; (c) holding the feed mixture in the vacuum zone for a time sufficient to form a vacuum-treated mixture; and (d) directing the vacuum-treated mixture through an extruder at an elevated pressure, wherein the extruder includes an extrusion conduit and means for propelling the vacuum-treated mixture through the extrusion conduit to provide an unformed continuous extrudate; (e) directing the unformed continuous extrudate to a die chamber having a first opening operably connecting the extrusion conduit to the die chamber, a second opening operably connecting the die chamber to a die, and inwardly slanting walls such that the internal diameter of the die chamber is larger proximate the first opening than the internal diameter of the die chamber proximate the second opening; (f) selectively vibrating the die chamber to provide substantial movement of the die chamber, said movement being in a direction substantially perpendicular to the direction of the unformed continuous extrudate, without providing substantial movement to the extrusion conduit; (g) directing the unformed continuous extrudate through the selectively vibrating die chamber; and (h) directing the unformed continuous extrudate through a final die to provide a formed extruded article.

In yet another specific embodiment, the apparatus should include the following elements: (a) a mixing chamber for mixing the cement-based feed mixture including water, aggregate and hydratable binder; (b) a vacuum chamber operably connected to the mixing chamber for directly or indirectly receiving the feed mixture from the mixing chamber and for providing a vacuum-treated mixture; (d) an extrusion conduit operably connected to the vacuum chamber through which the vacuum-treated mixture is directed to provide an unformed continuous extrudate; (e) a die chamber for directly or indirectly receiving the vacuum-treated mixture, the die chamber having a first opening operably connecting the extrusion conduit to the die chamber, a second opening operably connecting the die chamber to a die, and inwardly slanting walls such that the internal diameter of the die chamber is larger proximate the first opening than the internal diameter of the die chamber proximate the second opening; (f) a vibrator for selectively vibrating the die chamber to provide substantial movement of the die chamber, said movement being in a direction substantially perpendicular to the direction of the unformed continuous extrudate, without providing substantial movement to the extrusion conduit; and (h) a final die operably connected to the die chamber for providing a formed extruded article. In a specific embodiment, which is also a preferred embodiment, the densified material is vibrated in an amount and to the extent it becomes plastic, or at least to some extent flowable. Other specific embodiments of the apparatus and method for selective vibration of extruded articles are shown in FIGS. 14 through 18 and are discussed in greater detail below.

H. Color Addition

Yet another specific embodiment of this invention relates to a method for adding color during a vacuum extrusion process. Alternatively, this embodiment of the invention is a method for extruding a cement-based mixture such as any one of the cement-based mixtures discussed herein. The method preferably includes mixing a feed mixture that includes water, binder and aggregate; subjecting the feed mixture to vacuum, i.e., a negative pressure to provide a densified mixture; then subjecting the densified, vacuum-treated mixture to extrusion to provide an extruded cement-based article. With the present embodiment, one or more pigments are included, preferably, being added to provide a variegated color scheme, e.g., swirls of color in the final extruded article. Broadly, the method of adding color of this invention includes the step of continuously adding a predetermined amount of color pigment to the feed mixture while it is still being mixed, and while it is still being moved through the process, e.g., as it passes through the pug mill toward the vacuum zone. The pigments can, however, be added at other points in the process as well.

More than one color can be added to the feed mixture at the same time in accordance with another specific embodiment of the invention, and the colors can be variegated, so as to form an uneven striped appearance. It is contemplated that certain color pigments, and certain combinations of color pigments, will provide the brick with the desired "brick-like" appearance. For example, in the proper quantities, iron oxide can provide the extruded article with a red brick appearance. To lighten or provide a "rough" natural appearance, the feed mixture can be variegated, by adding titanium oxide in addition to iron oxide. Other pigments can also be added, such as cupric oxide.

In a specific embodiment, a dry color dispenser can be used to add the pigments. The color can be added to the feed mixture in pigment form while the feed mixture is in the mixer, dry or as a slurry. A slurry is preferably added via an automatic process involving the steps of concurrently adding both water and conventional dry powder pigments to the feed mixture, mixing them together to form a slurry, and transferring this slurry to the mixing vessel or the pug mill. For a "dry" system, the dry granules can be automatically weighed and transferred to the mixer. The process is preferably on a "per batch" basis and can include a wide variety of batch designs, depending on the type and amount of pigment.

Furthermore, an automation panel can be used to automatically control the dispensing of up to four separate colors simultaneously. This panel receives a signal from the batch cycle, and proceeds to weigh required amounts of color and/or water according to a pre-set recipe. The panel will then "hold" until the cycle is ready for dispensing to the mixer. Upon receiving the second signal, the panel will dispense color to the mixer, and the mixer will not continue that cycle until the color scales read "zero."

The blender, dispenser and scale system can have tanks, which should be constructed of stainless steel to restrict contamination of the colored pigments. Prepiped electropneumatic controls can be included. A scale system can be included, having a compression cell platform scale with digital readout. Four-color pods and screw feeders constructed of mild steel, with enamel coating inside can be used, the pods having ball-type vibrators for smoother flow. The pods can be situated on an elevated platform and fork truck handled for refill operation. Butterfly valves provide for closure of color pod while refilling. Screw conveyors with hydraulic drives can be used to carry the color from the pod to the blender.

I. Discussion of Drawings

The drawings illustrate specific embodiments, examples and details of certain aspects of the invention. These will now be discussed.

Referring to FIG. 1, a specific embodiment of the apparatus and process of this invention is illustrated. The ingredients are preferably mixed in mixing tank 20 which should include a stirring device such as propeller 24. Feed conveyor 26 is operated in response to feed conveyor motor 22. The feed conveyor can be a conventional belt conveyor, and is preferably contained within a chute or enclosure to contain the feed mixture coming from the mixing tank. Adjacent and operably connected to the downstream end of the feed conveyor is a hopper 28 which receives the feed mixture leaving the feed conveyor. The design or shape of the hopper is not critical but should have a tapered lower portion, so as to funnel or control the volume of feed mixture going to the metering conveyor 32, which is controlled by metering conveyor motor 30, which can be a conventional belt type conveyor. At this point in the process, although a certain degree of mixing should have occurred, the ingredients are typically not thoroughly or uniformly mixed. Preferably, at least some water should be present in the mixture, at least sufficient to moisten the granular mixture, but not so much water as to initiate hydration of the binder present in the mixture. The details of the mixing operation are discussed elsewhere herein. The feed mixture is directed via metering conveyor 32 into the mixing device, which in this specific embodiment is a pug mill 38, which includes a cutting or mixing element 40 that includes a shaft 36 drivingly connected to mixing motor 34. Preferably, the walls of the mixing chamber are tapered at the far end 42, at the location where the feed mixture is fed to the vacuum chamber or, preferably, the pretreatment chamber 44. In an embodiment not shown, the pretreatment zone is part of the pug mill, including the tapered walls 42. A water source 46 is provided, to deliver water to the feed mixture in the mixing chamber 38 via water supply line 48, which feeds into a multi-valve water distribution device 50. Two double restrictor plates form part of the pretreatment zone 44. Also shown is a shredder 45, which is preferably part of the vacuum zone, but is connected to the same drive shaft 36 used to drive the rotary mixing blades of the pug mill 40, and thus is preferably driven by the mixing motor 34. Alternatively, a shredding device may be positioned elsewhere, e.g., in the vacuum chamber 52 and driven by a separate motor. (Not shown.)

In operation, the feed mixture passes from the metering conveyor 32 to the mixing chamber 38 (here, a pug mill) and from there it passes through the pretreatment zone 44, through the shredder, and into the vacuum chamber 52. As shown herein, the "vacuum zone" includes the vacuum chamber and the area where the shredder is located. The "pretreatment zone" in this specific embodiment is not considered part of the vacuum chamber. The "pretreatment zone" does, however, extend partially into the downstream end of the mixing chamber, which includes a pug mill shell having a tapered end. But the pretreatment zone of that specific embodiment also includes a separate pretreatment chamber to provide proper balancing of forces. As indicated in the drawing, the vacuum chamber receives the feed mixture 53, which, in accordance with a preferred aspect of the invention, is undergoing hydration, and is moving from a noncohesive state to a substantially fully cohesive state, and is also undergoing additional densification (in addition to the densification provided during the pretreatment zone). A vacuum source 54 is connected to the vacuum chamber 52, preferably by a vacuum line 56. The vacuum chamber preferably includes a pressure valve 58 for monitoring the vacuum within the vacuum chamber. Preferably, the flow of feed mixture is controlled so that some space 55 is maintained within the vacuum chamber 52, to prevent interruption in the process. In operable connection with and preferably adjacent to the vacuum chamber is the extruder 64, which includes drive shaft 62 connected to extruder motor 60. The "die," as that term is used herein, includes the die chamber 66 and final die 68, through which the extruded concrete (herein defined as the feed mixture after substantial densification, hydration and cohesion has taken place) passes.

Figure 2:
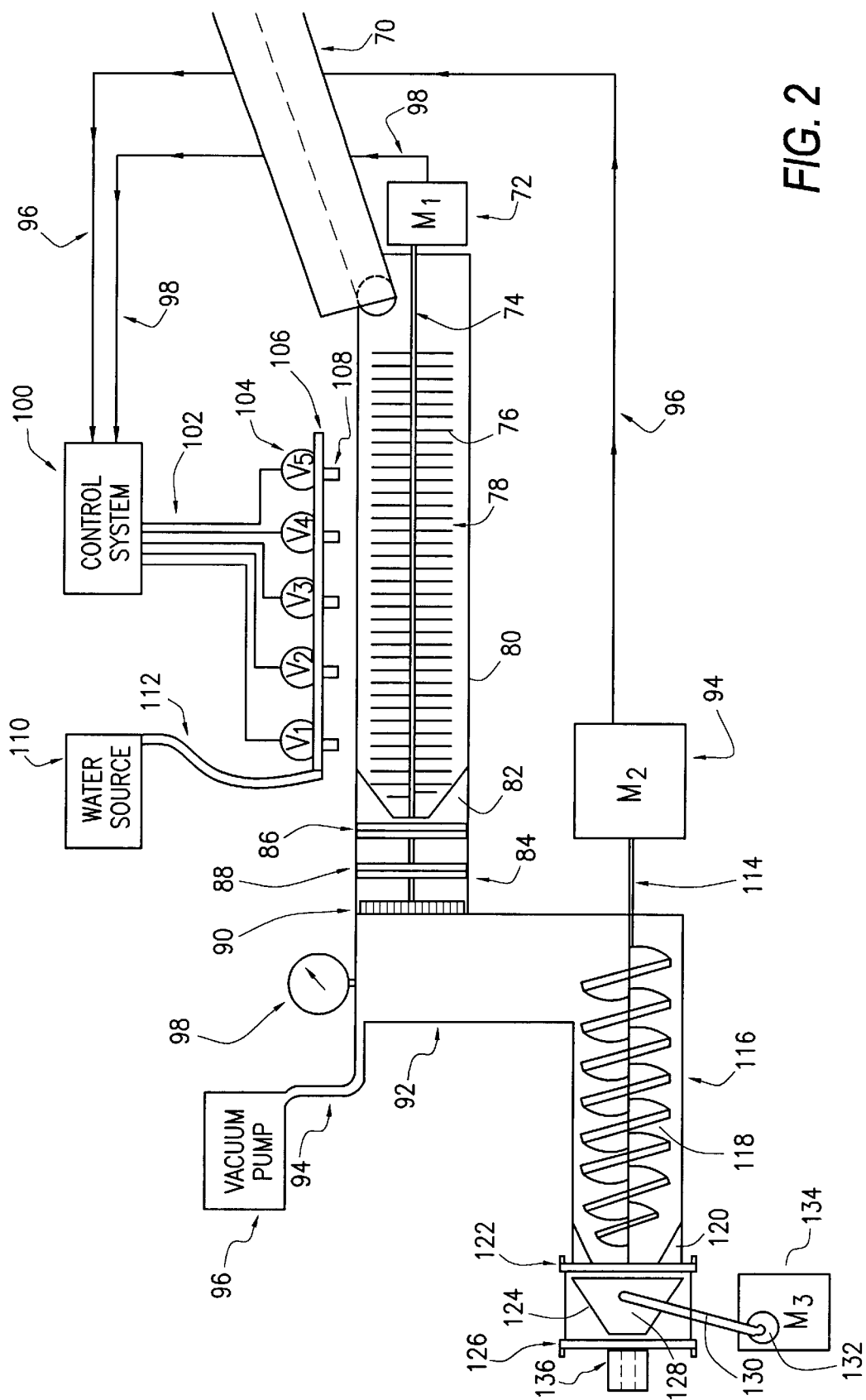
FIG. 2 is another side view of a slightly different process and apparatus.

Referring now to FIG. 2, a more detailed side view is shown of a process and apparatus of the invention. In FIG. 2, metering conveyor 70 moves feed mixture to the mixing chamber, herein a pug mill. The mixing chamber 80 includes a rotating mixer 78, which includes shaft 74 and blades 76, which is driven by mixing motor 72. As discussed above, the tapered ends of the pug mill are considered part of the mixing chamber, but in certain embodiments may be considered part (or all) of the pretreatment zone. The pretreatment zone in FIG. 2 includes pretreatment chamber 84, and also includes two double restrictor plates 86, 88. Past the second restrictor plate 88 is a shredding wheel 90, which is driven by mixing shaft 74 and mixing motor 72. The device shown in FIG. 2 also includes vacuum chamber 92, vacuum pump 96 and vacuum line 94, with the pressure within the vacuum chamber being monitored by means of pressure gauge 98. The extruder 116 is defined as including extrusion shaft 114 and extruding blade 118, as well as a conduit for containing the blades and shaft. The extruder is driven by extrusion motor 94.

In the device shown in FIG. 2, a moisture control system is included. The control system 100 is configured to receive signals 96 and 98 from, respectively, extrusion motor 94 and mixing motor 72. Preferably, the signals 96, 98 reflect the load on the motors 94, 72 in terms of amps. Control system 100 receives the signals 96, 98 and determines the appropriate levels of water to add to the feed mixture in the mixing chamber 80, in accordance with aspects of this invention described above. As shown in FIG. 2, the control system provides output signals 102 to the valves 104, which control the volume of water exiting each water distributor 108, which is fed by water line 112 from a water source 110. The water provided to the mixing chamber provides the appropriate moisture level for the feed mixture prior to its passage to the vacuum chamber. In accordance with different aspects of the invention, the moisture level can either be sufficiently high so that excess water is present in the feed mixture, or it may be sufficiently low so that no excess water is present in the feed mixture.

Also, there is shown in FIG. 2 a selective vibration feature in accordance with a specific embodiment of the invention. As discussed above, the extrusion process preferably is performed in a device that includes a die that includes a die chamber 124 and final die 136. The die chamber 124 can be partially separated from the extrusion conduit by a plate 122, having an aperture through which a controlled volume of densified concrete mixture is permitted to pass. Preferably, as shown in FIG. 2, the die chamber 124 is tapered. In accordance with a preferred aspect of the invention, the die chamber is selectively vibrated. Here, it is vibrated by vibration device 134 connected by a cam or an irregular-shaped wheel 132 to connector shaft 130 to die chamber 124. After the densified extruded material exits the die chamber through exit plate 126, it is fed to the final die 136, from which it becomes an extruded article suitable for stacking and curing.

Figure 3:
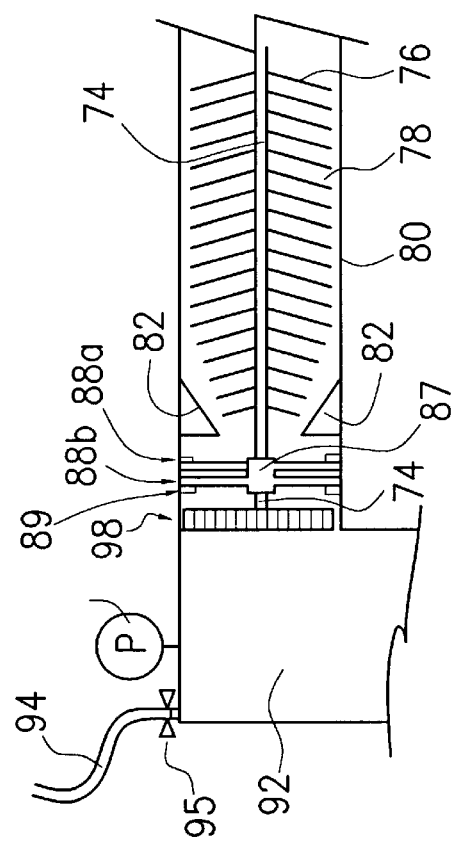
FIG. 3 is a side view of a mixing chamber, pretreatment chamber and vacuum chamber.
Figure 4:
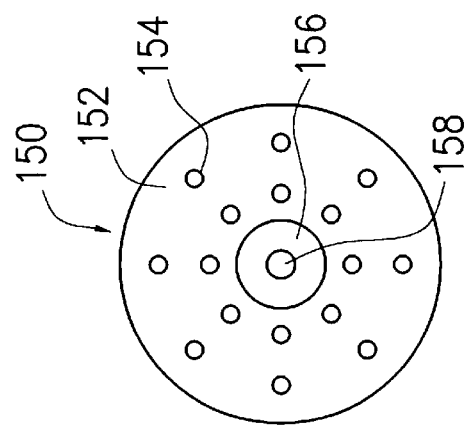
FIG. 4 is a front view of a restrictor plate.
Figure 5:
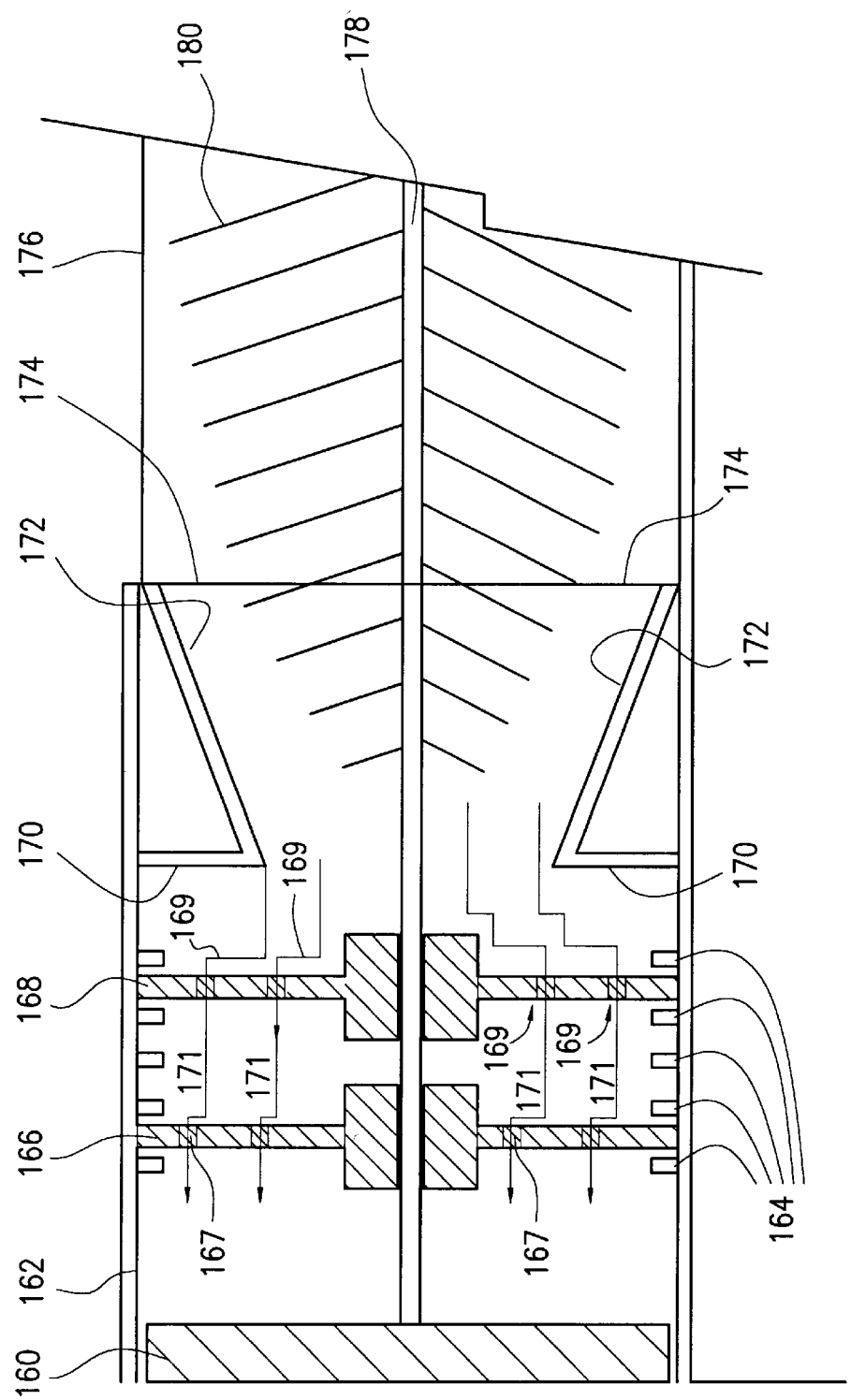
FIG. 5 is a side view of a pretreatment chamber.

FIGS. 3, 4 and 5 show different portions of the mixing, pretreatment and vacuum zones. In FIG. 3, there is shown a pug mill with shaft 74, blades 76 (pitched forward) and mixing chamber walls 80, as well as tapered walls 82. The cut-away view in FIG. 3 shows two restrictor plates 88a, 88b having a single bushing. In the specific embodiment of FIG.

3, the two restrictor plates form an integral unit and are a set distance apart, e.g., from 2 to 6 inches. While not reflected in FIG. 3, the circumferential shape of the pretreatment section can be irregular, e.g., hexagonal, such that the restrictor plates 88a, 88b can be placed between holding flanges 89 and will not rotate. The inner portion 87 of the restrictor plate unit should have an aperture that is sized and shaped such that the mixing shaft 74 can rotate freely within it, to rotate the shredding wheel 98. Another feature shown in FIG. 3 is a valve 95 for controlling the vacuum created by suction of air through vacuum line 94, to provide an appropriate vacuum level within vacuum chamber 92.

Now referring to FIG. 4, there is shown a specific embodiment of a restrictor assembly 150, which can be used in the place of the restrictor plates 88a, 88b. Restrictor assembly 150 is circular or disc-shaped. The restrictor plate 152 should be sized so that the outer rim of the plate abuts the inner wall of the pretreatment chamber, at least to the extent that no unnecessary amounts of air or feed mixture can pass. The plate portion 152 acts as a "barrier," described elsewhere in this patent as part of the pretreatment section. Apertures or ports 154 are formed in the plate 152 itself. The restrictor assembly 150 also includes the bushing 156, which has a passage or aperture 158 through which the mixing shaft can pass and should rotate freely. The number and placement of the ports 154 can be varied according to the desired flow characteristics for the feed mixture through the pretreatment zone.

Referring now to FIG. 5, a cut-away side view of a specific embodiment of the mixing, pretreatment and vacuum zones are shown. In particular, there is shown mixing chamber with chamber walls 176. The pug mill in the device in FIG. 5 includes mixing shaft 178 with pitched-forward blades 180. An opening (not shown) may be formed in the top portion of mixing chamber wall 176 to provide for the introduction of water for purposes of controlling moisture. This opening may be in the form of a slit or a wider opening. Alternatively, the pug mill chamber may be closed, with the exception of water injection hose fittings to permit the introduction of water, the volume being controlled by valves. (Not shown.) Also shown in FIG. 5 as part of the mixing chamber are tapered walls 172 leading from the mixing chamber to the pretreatment chamber. The pretreatment chamber includes restrictor plates 168, 166, which are kept in place by flanges 164. As discussed elsewhere herein, the "pretreatment zone" as defined in this patent may include or overlap a portion of the mixing chamber. The restrictor plates 166, 168 include ports 167. As indicated by the arrows 171 in FIG. 5, the flow of the feed mixture is restricted, first by restrictor plate 168. A feed mixture processed through the apparatus in FIG. 5 contacts the upstream surface of plate 168 (on the side of the pug mill), then moves along the surface until it "finds" an aperture 169, then passes through that aperture and flows downstream toward the second restrictor plate 166. After contacting and moving parallel to the surface of the upstream side of plate 166, it "finds" another aperture 167, then passes through toward the shredder and vacuum chamber. In a specific embodiment, the pressure varies as the feed mixture moves from mixing chamber to the different stages of the pretreatment zone and into the vacuum zone, which in this case includes shredder 160.

Figure 6:
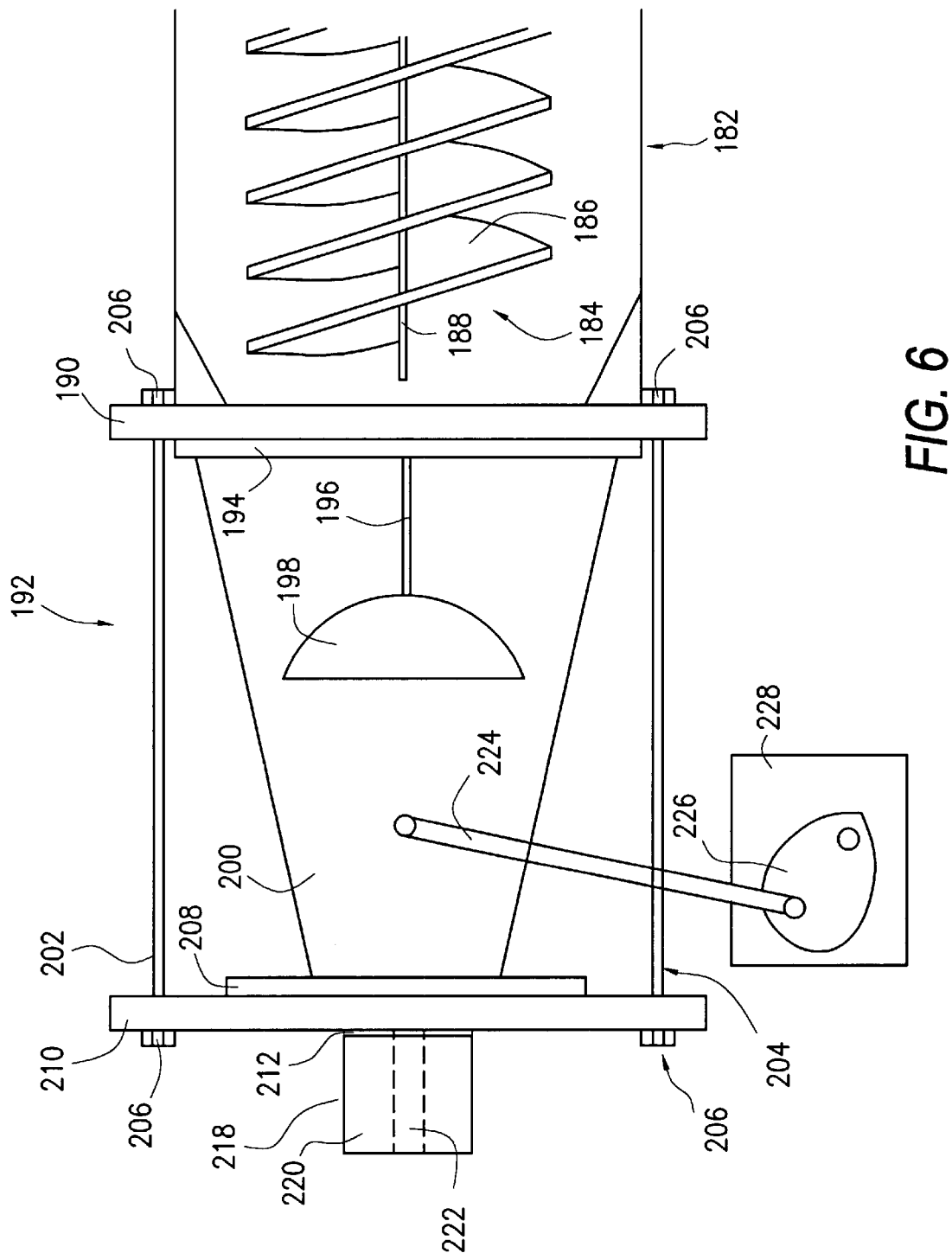
FIG. 6 is a side view of a selectively vibrated die chamber.

Referring now to FIG. 6, another aspect of the invention is illustrated. In particular, a selective vibration device is shown. Extruder 182 is shown having a rotating auger 184 with auger blades 186 and shaft 188. The auger is operated so that the densified mixture, coming from the vacuum chamber, is directed toward the final die through the die chamber. The die assembly is the portion between the entry plate 190 and the final die 218. The entry plate 190 is preferably disc-shaped, i.e., circular, but it may have virtually any geometrical shape, as desired. On the downstream side of the entry plate is the compressible element 194 that prevents or inhibits the transfer of movement from the die chamber 200 to the auger or extruder. Also shown is shaft 196 and baffle 198. The die chamber 200 shown in FIG. 6 is tapered, to direct the mixture toward the final die 218. On the downstream end of the die chamber there is a compressible element 208, which, like compressible element 194, acts as a shock absorber to prevent or minimize the transfer of movement from the vibrating die chamber 200 to the final die 218. The compressible element 208 is affixed to exit plate 210, which is connected to the entry plate 190 via spacing or connector bars 202, 204, which are kept in place by adjustable nuts 206. As shown in this specific embodiment, the nuts 207 are attached to the threaded ends of the connector bars 202, 204 so that they can be tightened or loosened, in order to keep the die chamber 200 in place, but not so tight so as not to unduly compress the compressible elements 208, 194, which might result in the transfer of movement from the die chamber to the extruder or final die, while the die chamber is being vibrated. As shown in FIG. 6, the die chamber 200 is connected via connector arm 224 to a cam-shaped wheel 226 driven by a vibration generating motor 228. The densified material then passes from die chamber 200 through an aperture in exit plate 210 and into the final die 218, which includes the solid die support element 220 and die aperture 222. The material also preferably passes through the core assembly 212, which is shown in FIG. 7 as including supporting cross-members 216 and a core bar 214 (herein shown to create a brick with three core holes).

Referring to FIG. 8, a device for providing continuous filament to the densified extrudate prior to formation into the final extruded product is shown. In the specific embodiment showing this feature of the invention, the fiber spool 230 feeds a continuous length of fiber, passing it over spool 232, which feeds the fiber (or filament) to the tension roller 234, which is connected via arm 238 to device 240, which is capable of controlling the tension via a tension controller 242. Filament 236 is then fed to the die chamber 246 through an input port 248 through which the filament is threaded to pass into the die chamber and through the exit aperture or plate 250 of the die chamber into the final die 252. As described elsewhere in this patent, the densified extrudate is passed from the extruder or auger 244 then into the die chamber 246 and then to the final die 252. In accordance with this aspect of the invention, a continuous filament is fed into the densified mixture in the die chamber, so that it contains the filament prior to being passed through the final die, thus forming an extruded cement based article containing a continuous filament, and can be cut into the appropriate size or length.

Figure 9:
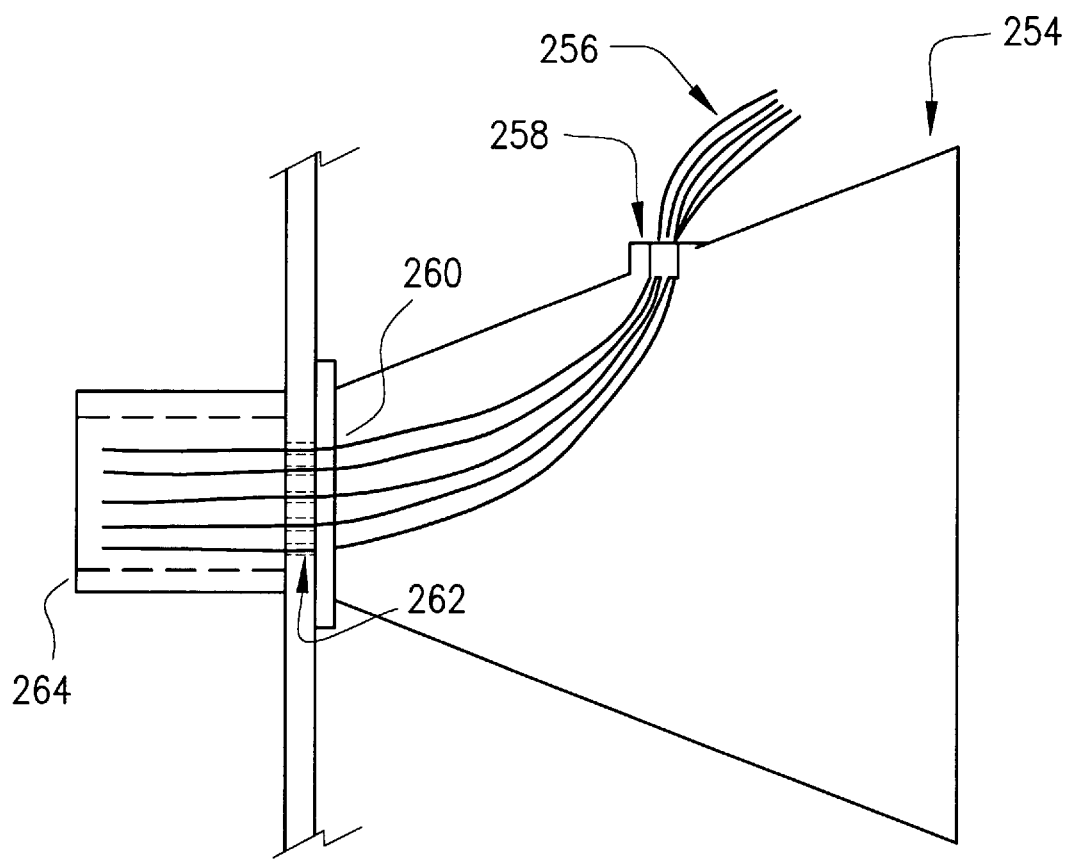
FIG. 9 is a side view of another version of a die chamber with a continuous fiber feeding feature.

Referring to FIG. 9, a slightly different embodiment is shown, which provides for multiple continuous filaments 256 being fed through an entry or input port 258 where it converges with the densified extruded mixture and is distributed evenly in the final article by passing through the individual passages 262, which should be formed as part of the die chamber exit plate, thus being distributed evenly in the final product when the extrudate passes through final die 264. FIGS. 10, 11, 12 and 13 are discussed in detail above.

Figure 14:
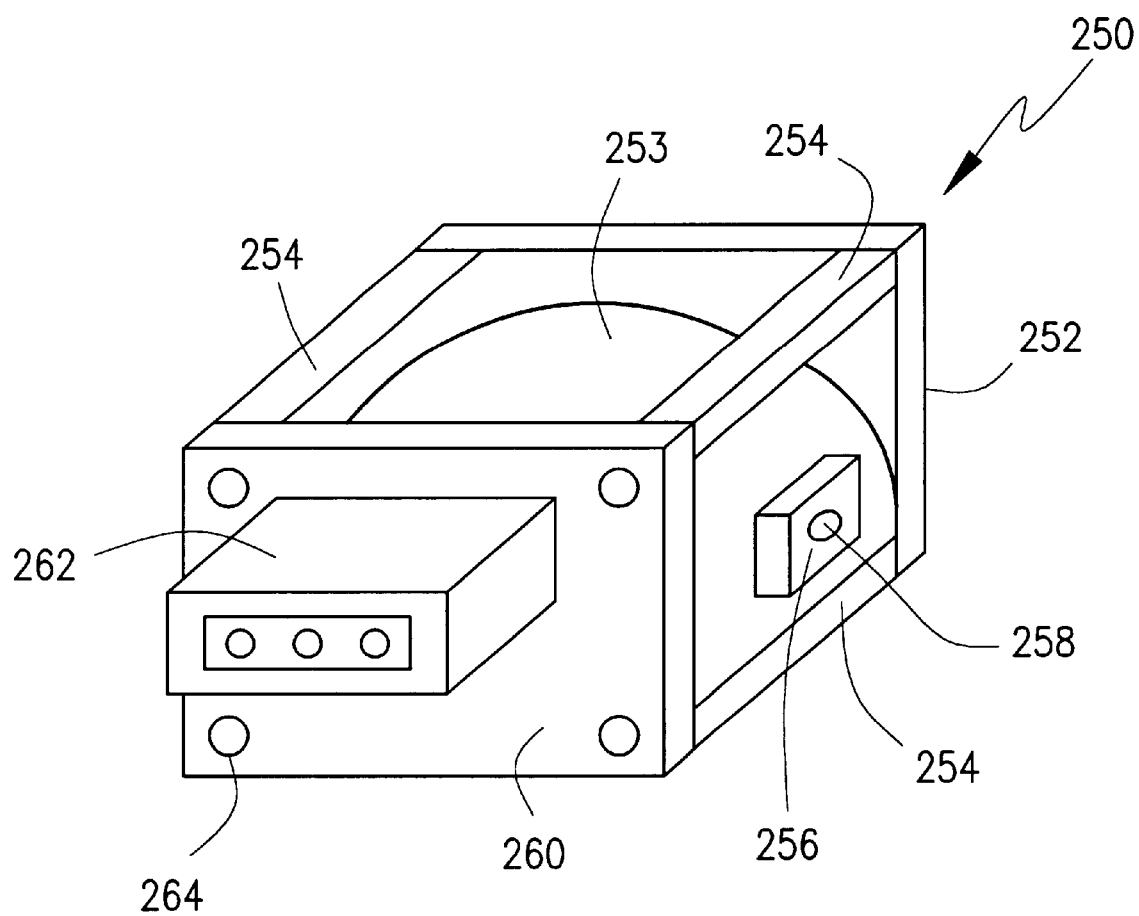
FIG. 14 is a perspective view of a vibratatory die of a specific embodiment of the invention.

FIG. 14 shows another aspect of a specific embodiment of the invention. The assembly 250 includes a stationary entry plate 252, having an entry opening (not shown) through which the extruded densified vacuum-treated material enters the die chamber 253. The assembly 250 also includes a stationary exit plate 260 connected to the entry plate 252 by four connecting members 254 each having adjustable ends 264 for tightening or loosening the plates 250, 260, e.g., with threaded ends and nuts. Also shown is a final die 262 through which the continuous extruded material exits. The assembly 250 also includes a mount 256 with an opening 258 for receiving a connector or "shaker" bar (not shown) that can be attached to a vibration generating device (not shown). Preferably, a gap exists between the vibrating die chamber and the stationary plates 252, 260, e.g., one of about 0.005 inches, sufficient to avoid transmitting excessive vibration, or preferably any vibration. Also included in a preferred embodiment is a gasket between each of the stationary plates and the vibrating portions between the plates, as discussed in greater detail above with reference to other specific embodiments.

Figure 15:
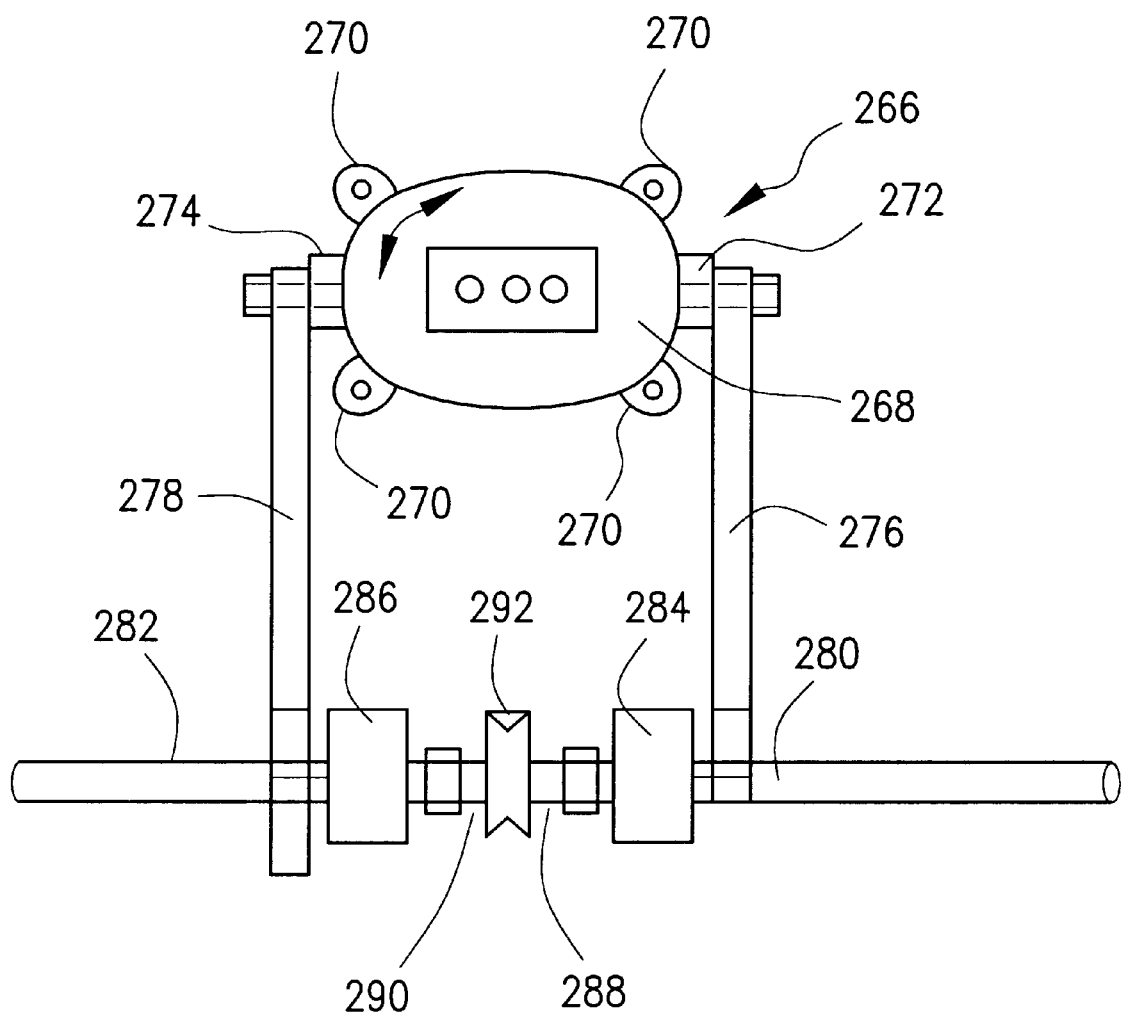
FIG. 15 is a front view of a vibratory die with two vibration or "shaker" arms.

A preferred embodiment of the vibration system is shown in FIG. 15 wherein assembly 266 includes a die chamber 268 with integral housing members 270 each having a conduit or hollow core for receiving members or bars for supporting the vibrating die chamber without transmitting vibration movement to at least one and preferably to both of the stationary elements, such as the extrusion chamber (not shown) or final die (not shown). The bars, however, preferably connect the entry and exit plates (not shown). Also shown in FIG. 15 are mounts 272, 274, each being similar to mount 256 shown in FIG. 14. Each of the mounts 272, 274 has attached thereto shaker bars 276, 278, respectively for transmitting vibration to the die chamber 268. Preferably, bars 276, 278 are removable for maintenance, cleaning, or adjustment of the die chamber. As shown therein, each of the shaker arms 276, 278 is also attached to a rotatable shaft 280, 282, respectively. Each shaft 280, 282 is connected to a bearing or other cylindrical device 284, 286, respectively. Each shaft 280, 282 is connected to the face of the cylindrical bearing 284, 286 at an off-center or eccentric position so that the rotation of each bearing generates an irregular motion in the shafts 280, 282. The bearings are connected by internal drive shafts 288, 290 (shown with couplings) into a pulley system including a pulley wheel 292 driven by a belt or chain (not shown) connected to a motor (not shown). The irregular movement of the shafts 280, 282 thus provides an up-and-down movement in the shaker arms that are out of sync so as to provide a "rocking" or "side-to-side" motion to the die chamber. A variable speed 5 HP power motor can be used, providing an RPM of 1,750 to the pulley wheel 292 to generate an RPM of approximately 7,000 in each shaft 280, 282. Naturally, a person skilled in the art can make a number of modifications to the device shown in FIG. 15 to provide the appropriate degree or optimum vibration. It is contemplated that tolerances for the shafts 282 could be from about 0.010 to 0.0025 inches, and are preferably from about 0.020 to 0.040 inches.

Figure 16:
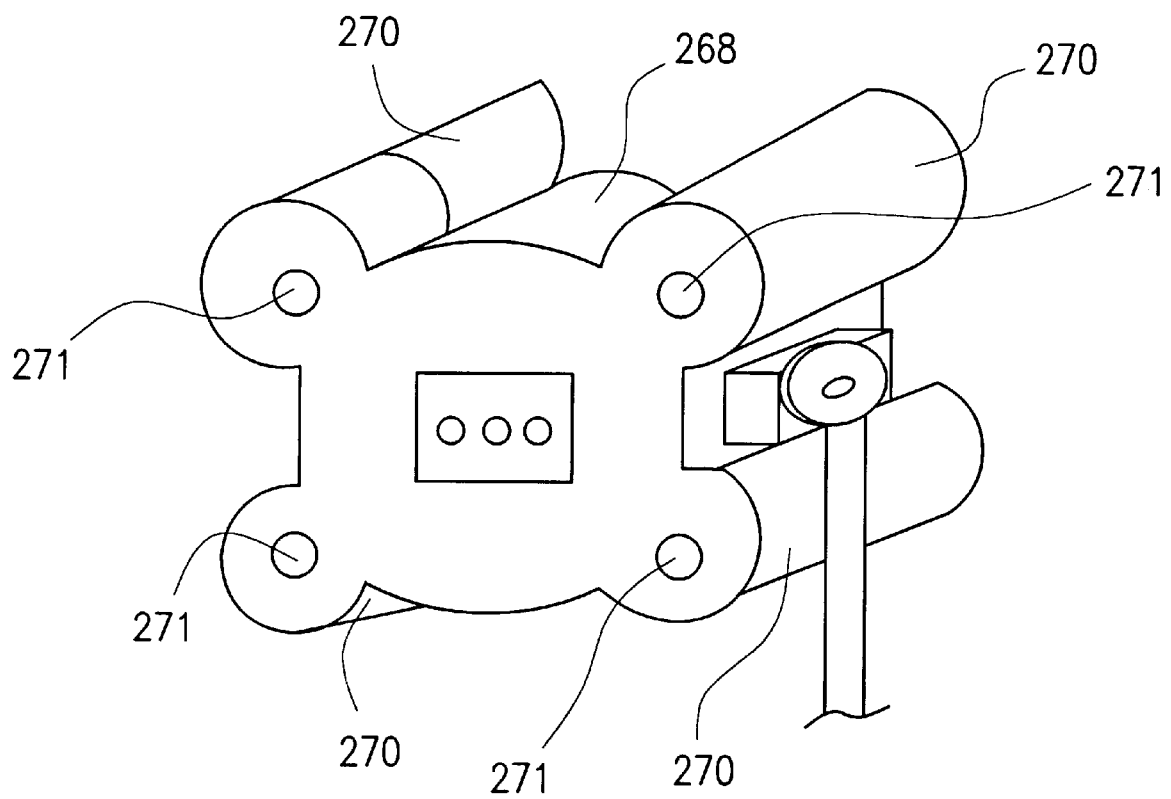
FIG. 16 is a perspective view showing another version of the die chamber of this invention.

Referring now to FIG. 16, a perspective view of a die chamber such as the die chamber in FIG. 15 is shown. Also shown in FIG. 16 is a mount with a shaft, shaker or connector arm attached thereto. The assembly has a unitary construction, with four integral supporting elements 270, each including conduits 271 for receiving bars or members that act to support, connect and pull together the exit and entrance plates (not shown) or other stationary elements. A specific embodiment of the invention includes a component manufactured by Firestone called a "Marsh Mellow," which is placed in each of the conduits 271. The component has a metallic sleeve, a metallic outside and a rubberlike interior through which a conduit runs so that the rubberlike material essentially "grabs" any bar passing through the conduit.

Figure 17:
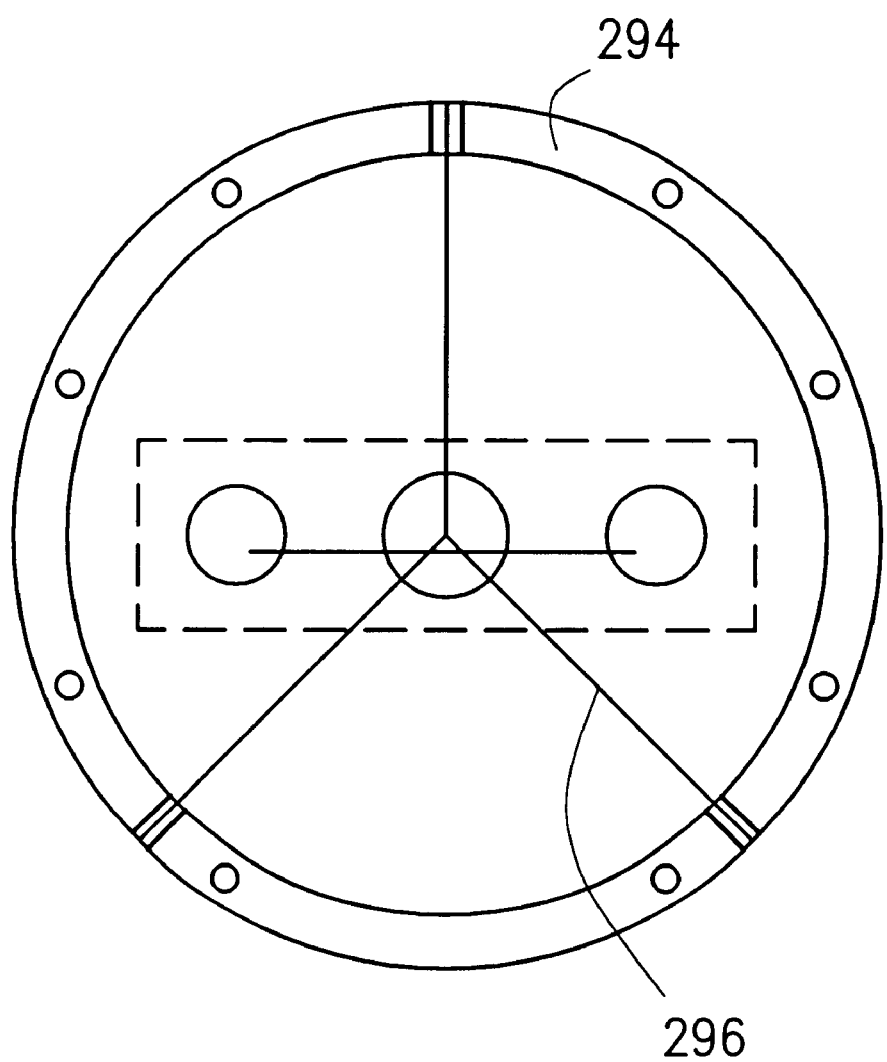
FIG. 17 is a front view of a vibrating die core assembly.
Figure 18:
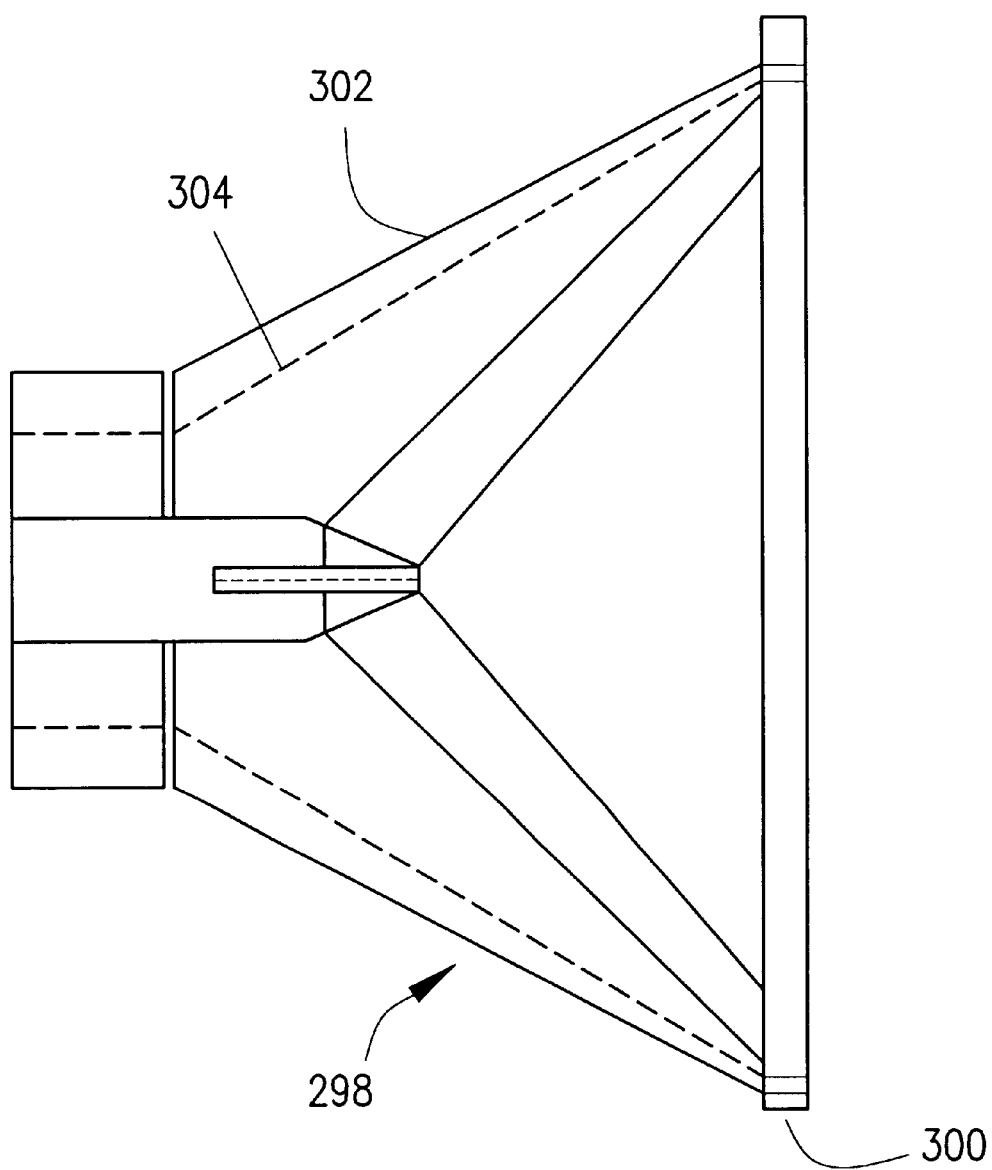
FIG. 18 is a side view of a vibratory die.

Referring now to FIG. 17, a front view of a vibratory die core assembly is shown with a ring 294 and arms 296. In FIG. 18, the die assembly 298 includes entrance plate 300 which is preferably stationary and connected to an extrusion chamber (not shown), and the vibratory housing 302 is shown with a tapered outer shell, as well as a tapered inner wall indicated by dotted lines 304. Other elements of the vibratory die will be recognized by a person skilled in the art.

J. Equipment

Although a variety of equipment can be used to carry out the process of the invention and to make the apparatus of this invention, the following provides some equipment that may be applicable in certain specific embodiments. Mixing and materials handling equipment that can be used with this invention are conventional and well-known and will not be described.

The extrusion device can be an EEI Premier concrete extruder, which includes a 150 HP main drive. The mixing device can be a 50 HP pug mill, also available from EEI Premier. Both devices can have variable frequency drives. As discussed above, the pug mixer is where the final water addition and mixing is done. While the water is being added, the mix is continually conveyed forward to the vacuum chamber. The pug mixing blades should be adjustable to control the mix flow. Replaceable wear liners should line the inside of the pug mill chamber. The mixer can be covered with individual doors that incorporate safety switches that automatically stop the extruder when opened. The vacuum chamber should be capable of maintaining a 29" of vacuum with a remotely placed water cooled vacuum system. A 16" main extrusion auger can be used, with replaceable auger flights and wear lining on extruder barrel. A Frecon Series 200 moisture control system can be used, modified in accordance with this invention. An EEI Premier extrusion die is preferably used, made in accordance with this invention, having vibrating pressure head mounts between the extruder and the stationary die. The pressure head reduces the friction associated with high pressure extrusion. In accordance with the selective vibration feature of this invention, by oscillating or vibrating the pressure head at varying frequencies, the amount of horse power to extrude is reduced. Moisture content can also be reduced, forming a stronger product and a stiffer extrusion column. The stationary die is located downstream of the vibratory pressure head. The replaceable stationary die provides the final extruded shape, and is manufactured from high wearing steel with replaceable components. Each die is fitted with a bridge assemblies to form internal voids in the extruded product when required. The die vibration system includes a stationary frame upon which the motor, bearing housings, belts, sheaves, and rotating eccentric shaft are mounted. The eccentric shaft is connected to the pressure head by linkages which create a rocking motion. The electric motor speed can be controlled so that each extruded article or product may have the optimum oscillating motion to provide strength, production speed and mix design flexibility.

Another feature relating to the process and apparatus of this invention is a cutter, which is preferably a universal cutter. The extruded column can be measured by a transitions conveyor. At a predetermined length, an electromechanical lock between those two pieces of equipment can be achieved, matching the cutter speed to the extruded column.

A cutting assembly drive motor can then be activated, slicing through the column. When the cut is complete, the lock between the equipment is released and the cutter returns to the home position. Depending on the product, interchangeable cutting assemblies for various sizes and shapes can be used. Included with those assemblies are cutting tables and different-sized blades. Also, an "acceleration table" can be provided, including individual belts with spaces between them to pull the cut product away from cutter. Preferably, a variable speed drive on the belts creates small separations between the product so that all sides are exposed to the initial curing. Bars can be located between the belts to raise vertically when a certain length of product interrupts the photo beam. A second variable speed drive can be incorporated to move the product forward to create a separation between the extruding column and the already cut product. At the end of the stroke, the bars descend, placing the cut product on the transfer table. An air transfer table can be included, pressurized with small holes that release a small amount of air to reduce the friction between the product and table during the transfer cycle. Once the product is placed on the air transfer table, a pusher moves the product 90 degree from its current flow pattern and places the cut product on the storage conveyor. At the end of the forward stroke, the pusher arm ascends so that new product may be placed on the transfer table while the arm is returning to the home position. Also, a storage conveyor and curing system can be included, which moves cut "green" product incrementally to accept the next row of cut brick with, for example, a storage capacity of 20 minutes based on 50,000 brick per 8 hour shift. A tunnel curing system can be used to cover the length of the conveyor. The curing system should be insulated and covered with a light gauge steel to protect the exterior. Moisture and heat can be maintained through the use of stainless steel pans filled with water. Submerged in these pans are heater coils. These coils will operate from a small boiler placed along side the system with automatic controls that will maintain temperature. Other conventional equipment can also be used, such as palletizing stations, placed at the end of the storage conveyor. Palletizing, however, is clearly conventional and well-known and will not be discussed in any detail.

EXAMPLES

The following examples demonstrate aspects of this invention from an experimental standpoint:

Example 1

In this example, certain feed mixture blends were formed for testing purposes. The first one (Blend #1) was formed into extruded articles where the feed mixture was composed of 10 wt % Portland cement, Type I-P, 40 wt % Class F flyash, 20 wt % concrete sand, 30 wt % pea gravel (⅜" maximum size), iron oxide pigment (3% of cement weight maximum), water (10 wt % of total dry weight maximum) and plasticizer (4 wt % of water weight maximum). Another blend (Blend #2) was identical to Blend #1 except that 15 wt % Portland cement and 35 wt % Class F flyash were used. Blend #3 was identical to Blend #1 except that 20 wt % Portland cement was used and 30 wt % Class F flyash was used. Blend #4 was composed of 10 wt % Portland cement, Type I-P, 40 wt % Class F flyash, 50 wt % cinder bottom ash, iron oxide pigment (3% of cement weight maximum), water (15 wt % of total dry weight maximum) and plasticizer (4 wt % of water weight maximum). Blend #5 was identical to blend #4 except that 25 wt % cinder bottom ash and 25 wt % concrete sand were used.

Example 2

In this example, selected feed mixture blends described in Example 1 were formed into paving bricks using vacuum extrusion in accordance with specific aspects of the invention, and the bricks were tested for compressive strength under ASTM C 67, with the following results, indicating properties comparable to molded bricks.

| Brick No. | Failure Points (lbs) | Failure Points (psi) |
| --- | --- | --- |
| 1A (Blend #1) | 327,000 | 10,750 |
| 2A (Blend #2) | 212,000 | 7,350 |
| 3A (Blend #4) | 158,000 | 5,470 |

Example 3

In this example, the same feed mixture blends described in Example 1 were formed into paving bricks, as in Example 2, and were then tested for 24-hour cold water absorption capacity, with the following results.

| Brick No. | Absorption (%) |
| --- | --- |
| 1B (Blend #1) | 2.7 |
| 2B (Blend #2) | 8.9 |
| 3B (Blend #4) | 9.6 |

A person skilled in the art will recognize many variations from the specific embodiments described above, based on information in this patent, without departing from the overall invention. For example, other elements or steps may be considered interchangeable with those described herein. Accordingly, the "claims" below, which define the invention, are intended to cover not only that which is literally set forth, but also any and all equivalents, including any changes or modifications to the invention that can provide similar advantages and benefits.

What is claimed is:

1. A process of forming an extruded cement-based article, comprising the steps of:

directing a cement-based feed mixture through an extruder at an elevated pressure and through a die chamber to a final die to thereby provide an extruded cement-based article; and, applying a vibrating force to the die chamber to facilitate the extruding of said article without transferring any substantial vibration to said extruder and said final die.

2. The process of claim 1 further comprising:

forming an initial cement-based feed mixture by combining and mixing an aggregate, a binder and a first volume of water in an initial mixing stage;

adding a second volume of water to the initial feed mixture in a final mixing stage to form a final feed mixture, wherein excess water is present either in said initial feed mixture, before the addition of the second volume of water, or in the final feed mixture, after the addition of the second volume of water, or both; and holding the final feed mixture in a vacuum zone for a time sufficient to remove excess water present in the final feed mixture to densify the feed mixture.

3. The process of claim 2, wherein the first volume of water is sufficient to provide excess water to the initial feed mixture.

4. The process of clam 2, wherein said second volume of water is sufficient to provide excess water to the final feed mixture.

5. The process of claim 4, wherein sufficient vacuum is maintained to remove substantially all of said excess water from said final feed mixture while it is in said vacuum zone.

6. A process of forming an extruded cement-based article, which process includes forming a cement-based mixture from starting ingredients that include water, aggregate and hydratable binder and passing the mixture through an extruder, a die chamber adjacent to the extruder, and a final die adjacent to the die chamber, the improvement comprising the step of selectively vibrating the die chamber to provide substantial movement of the die chamber with substantial isolation of the extruder and the final die from the vibration.

7. A process of forming an extruded cement-based article, comprising the steps of:

forming a cement-based mixture comprising water, aggregate and binder;

directing the mixture through an extrusion zone at an elevated pressure to form a continuous unformed extrudate;

directing the extrudate directly or indirectly from the extrusion zone to a transition zone and through the transition zone, said transition zone having a die chamber;

selectively vibrating the die chamber without vibration of the extrusion zone; and directing the second mixture from the transition zone to a die and through the die to form an extruded cement-based article, wherein the die chamber is isolated from the extrusion zone and the die such that the extrusion zone and the die are substantially isolated from the vibration applied to the die chamber.

8. A process of forming an extruded cement-based article, comprising the steps of:

directing a cement-based feed mixture through an extruder at an elevated pressure, wherein the extruder comprises an extrusion conduit and means for propelling the feed mixture through the extrusion conduit to provide an unformed continuous extrudate;

directing the unformed continuous extrudate to a die chamber having an internal diameter that varies along its length, the die chamber further having a first opening operably connecting the extrusion conduit to the die chamber and a second opening operably connecting said die chamber to a die, and inwardly extending walls such that the internal diameter of said die chamber is larger proximate the first opening than the internal diameter of said die chamber proximate the second opening; and selectively vibrating said die chamber to provide substantial movement of said die chamber, said movement being in a direction substantially perpendicular to the direction of said unformed continuous extrudate, without providing substantial movement to the extrusion conduit; directing said unformed continuous extrudate through the selectively vibrating die chamber; and directing said unformed continuous extrudate through a final die to provide a formed extruded article, wherein the first opening operably connecting the die chamber to the extrusion conduit and the second opening operably connecting the die chamber to the die substantially isolate the extrusion conduit and the die from the vibration applied to the die chamber.

9. The method of claim 8, further comprising:

forming a cement-based feed mixture comprising water, an aggregate, and a binder;

directing the feed mixture to a vacuum zone, whereby sufficient vacuum is maintained in the vacuum zone to remove entrained air and excess water from said feed mixture; and holding said feed mixture in the vacuum zone for a time sufficient to form a vacuum-treated feed mixture, wherein directing the feed mixture through the extruder comprises directing the vacuum-treated feed mixture through the extruder.

10. A process for forming an extruded, cement-based article, comprising:

mixing a cement-based feed mixture including water, binder and aggregate;

densifying the feed mixture in a vacuum zone, where the pressure within the vacuum zone is less than atmospheric pressure;

extruding the densified material through an extrusion apparatus, a die chamber, and a die; and selectively vibrating the die chamber without substantially vibrating the extrusion apparatus and the die to form an extruded cement-based article, wherein the extrusion apparatus and the die is isolated from the die chamber such that vibrating the die chamber does not substantially vibrate the extrusion apparatus and the die, and the feed mixture is shredded after being mixed and before being fully densified.

11. A process for forming an extruded cement-based article, comprising:

mixing together a cement-based feed mixture including water, binder and aggregate;

densifying the feed mixture to form a densified cement-based material;

extruding the densified material through an extrusion apparatus, a die chamber, and a die to form an extruded cement-based article; and selectively vibrating the die chamber, wherein the extrusion apparatus and the die are isolated from the die chamber such that the vibration applied to the die chamber is not substantially transferred to the extrusion apparatus and the die, and the process includes the steps of (a) measuring a thickness of said feed mixture during mixing, (b) comparing the measured thickness of said feed mixture with a reference value; and (c) adding water to said feed mixture in response to the comparison between said measured thickness and the reference value.

12. The process of claim 11, where water is added to lower a viscosity or thickness of said feed mixture when the comparison shows that said measured thickness of said feed mixture is too high.

13. The process of claim 11, wherein said feed mixture is mixed using a pug mill with a mixing shaft driven by a motor and wherein said thickness of the feed mixture is measured by measuring a load on the motor driving the pug mill shaft.

14. The process of claim 13 wherein said feed mixture is extruded after vacuum treating in an extruder after vacuum treating that includes an extruder shaft driven by an extruder motor and said load on said pug mill motor is compared to a load on the extruder motor to determine whether said load on said pug mill motor is too high and whether to add water to obtain a desired moisture level.

15. The process of claim 11, wherein a mixing motor is used to mix the feed mixture and wherein the step of measuring the thickness of the feed mixture includes measuring the load on the mixing motor.

16. The process of claim 15, wherein an extrude motor is used to extrude the densified material, and the reference value is based on the load on the extruder motor during extrusion.

17. The process of claim 16, wherein the comparison between the measured thickness of said feed mixture and said reference value includes a comparison between the load acting on the mixing motor and the load acting on the extruder motor.

18. A process of forming an extruded cement-based article, comprising the steps of:
   forming a cement-based feed mixture comprising water, aggregate and binder;
   directing said feed mixture through a pretreatment zone with an entry section and an exit section in which flow of said feed mixture is restricted in an amount sufficient to increase a density of the said mixture and decrease a volume flow rate of said feed mixture, the pretreatment zone having a tortuous flow path extending between the entry and exit sections thereof that said feed mixture follows as it is directed through said pretreatment zone, said tortuous flow path applying a resistance force to said feed mixture;
   directing said feed mixture to a vacuum zone, wherein sufficient vacuum is maintained in the vacuum zone to remove entrained air from said feed mixture, said resistance forces applied to said feed mixture at least partially resisting suction forces imposed on said feed mixture by said vacuum zone;
   holding said feed mixture in said vacuum zone for a time sufficient to form a densified feed mixture;
   directing the densified feed mixture trough an extruder, a die chamber adjacent to the extruder, and a final die adjacent to the die chamber at an elevated pressure to provide an extruded, cement-based article; and
   vibrating the die chamber while substantially isolating the extruder and the final die from the vibrations applied to the die chamber.

19. The process of claim 18, wherein the step of restricting said flow rate of said feed mixture in said pretreatment zone includes passing said feed mixture through at least two sets of apertures to reduce said flow rate of said feed mixture entering said vacuum zone.

20. The process of claim 18, wherein said feed mixture is shredded after the flow rate of the feed mixture is reduced.

21. The process of claim 18, wherein said feed mixture is compressed prior to being directed to said vacuum zone.

22. The process of claim 18, wherein said vacuum in said vacuum zone is sufficient to remove any excess water from the feed mixture.

23. The process of claim 18, wherein said vacuum in said vacuum zone is maintained at a level of from about −5 to −15 bars.

24. The process of claim 18, wherein the vacuum is maintained such that it does not vary, more than about 1 bar over a period of about 1 hour.

25. The process of claim 18, wherein the elevated pressure applied to said densified feed mixture is less than about 5,000 psi.

26. The process of claim 18, wherein the elevated pressure applied to said densified feed mixture is from about 300 psi to 1,500 psi.

27. The process of claim 18, wherein the densified vacuum-treated mixture has a density within a range of from about 40 to 200 lbs/ft$^3$.

28. The process of claim 18, further including the steps of:
   taking a measurement of the amount of moisture in said feed mixture at a first location in said process and supplying additional water to said feed mixture in response to said moisture measurement.

29. The process of claim 18, wherein said pretreatment zone includes a plurality of baffles interposed between said entry and exit sections thereof.

30. The process of claim 18, wherein said feed mixture is shredded in said vacuum zone.

31. The process of claim 30, wherein said feed mixture is shredded by passing said mixture through a multiple-blade rotary shredder.

32. The process of claim 18, wherein said feed mixture is directed by a pug mill in said mixing zone to said vacuum zone.

33. The process of claim 32, wherein the pug mill has mixing blades that are pitched forward for advancing the feed mixture toward the vacuum zone.

34. The process of claim 18, wherein the step of restricting the flow of said feed mixture in said pretreatment zone includes providing a plurality of barriers in a flow path of said feed mixture to define said tortuous path and each said barrier having apertures through which said feed mixture is passed, such that the volume flow rate of said mixture is reduced when it contacts said barriers and passes through the apertures toward said vacuum zone.

35. The process of claim 34, wherein said barrier has a substantially planar surface and said feed mixture is directed against the planar surface at an angle of about 90 degrees to said planar surface.

36. The process of claim 35, wherein after initially contacting said planar surface, at least a portion of said feed mixture moves parallel to said planar surface and then passes through said apertures of said barrier toward the vacuum zone.

37. An apparatus for forming an extruded cement-based article, comprising:
   a vacuum section configured to receive a feed mixture comprising an aggregate, a binder, and water, wherein a preselected level of vacuum is maintained in an amount sufficient to remove a preselected amount of entrained air and excess water from said feed mixture and thereby provide a densified vacuum-treated mixture of a desired density; and,
   an extrusion section for providing an extruded cement-based article, operably connected to said vacuum section, and including an extruder for receiving said densified vacuum-treated mixture from said vacuum section, a final die, and a die chamber interposed between the extruder and the final die and configured to be vibrated, wherein the die chamber is isolated from the extruder and the final die to prevent transferring a substantial amount of the vibrations to the extruder and the final die.

38. The apparatus of claim 37, further comprising:
   a mixing section for mixing together a cement-based feed mixture from the aggregate, the binder and water; and
   a pretreatment section interposed between the mixing section and the extrusion section and operably connected to the mixing section for receiving the feed mixture from the mixing section,
   wherein along a flow path of said feed mixture the pretreatment section includes a plurality of resistance members disposed in said feed mixture flow path and oriented such that the resistance members are generally perpendicular to said feed mixture flow path to thereby apply a resistance force to and densify said feed mixture as it passes through said pretreatment section.

39. The apparatus of claim 38, wherein said pretreatment section further comprises a shredder.

40. The apparatus of claim 38, wherein said pretreatment section includes an entry and an exit spaced apart from each other such that said feed mixture flow path extends between said chamber entry and exit and said resistance members include a plurality of baffles interposed between said pretreatment section entry and exit.

41. The apparatus of claim 38, wherein two of said resistance members are disposed along said feed path, one of said resistance members including a first wall with an entry aperture through which said feed mixture enters said pretreatment section and the other of said resistance members including a second wall with an exit aperture through which said feed mixture exits said pretreatment section.

42. The apparatus of claim 41, wherein said pretreatment section further includes a restrictor to increase the density of said feed mixture.

43. The apparatus of claim 38, wherein said resistance members further includes at least two stationary with plates having ports through which said feed mixture flows, the stationary plates being disposed between entry and exits of said pretreatment section.

44. The apparatus of claim 43, wherein said stationary plates are positioned with respect to each other such that said plate ports lie offset to one another, said stationary plates being further separated by a distance of from about 2 to 6 inches.

45. The apparatus of claim 43, wherein at least one of said stationary plates is adjustable such that the relative position of the ports in each plate can be changed or the distance between the stationary plates can be adjusted.

46. The apparatus of claim 38, wherein the effective flow area of the pretreatment section reduces the flow of the feed mixture in an amount sufficient to prevent a substantial volume of air in the feed mixture from entering the vacuum zone.

47. The apparatus of claim 46, wherein the flow area is sufficient to prevent air from entering in an amount sufficient to raise the pressure of the vacuum zone.

48. The apparatus of claim 47, wherein the flow area is sufficient to prevent air from entering in an amount sufficient to raise the pressure of the vacuum zone about 1 bar.

49. An apparatus for providing a formed, extruded cement-based article from a cement-based feed mixture, comprising:
an extrusion conduit configured to receive the feed mixture;
a die chamber for directly or indirectly receiving the feed mixture, the die chamber having an interior passage extending for a length of said die chamber, said die chamber having a first opening operably connecting the extrusion conduit to the die chamber interior passage, a second opening operably connecting said die chamber interior passage to a die, said die chamber interior passage having a cross-section that varies in dimension along its length such that said die chamber interior passage cross-section is larger proximate the first opening than proximate the second opening;
a vibrator for selectively vibrating the die chamber to apply vibration to said die chamber, with substantial isolation of said extrusion conduit from the vibration;
a final die operably connected to the die chamber for providing the formed, extruded cement-based article; and,
said die chamber being interposed between said extrusion conduit and said final die, said die chamber further being isolated from abutting contact with said extrusion conduit and final die by flexible members interposed between said die chamber and said extrusion conduit and final die, whereby said substantial vibration applied to said die chamber is substantially not transferred to said extrusion conduit and said final die, said vibration facilitating passage of said feed mixture through said die chamber.

50. The apparatus of claim 49, wherein the vibrator for selectively vibrating the die chamber comprises a motor operably connected to the die chamber for vibrating the die chamber.

51. The apparatus of claim 49, wherein the vibrator for selectively vibrating said die chamber comprises a connector attached to the die chamber, said connector driven by a motor, wherein the motor is capable of providing movement to said connector and to said die chamber.

52. The apparatus of claim 49, wherein the die chamber is flexibly attached to the extrusion conduit such that no substantial vibration movement of the die chamber is transferred to the extrusion conduit.

53. The apparatus of claim 49, wherein the die chamber is flexibly attached to the final die such that no substantial vibration movement of the die chamber is transferred to the final die.

54. The apparatus of claim 49, wherein a compressible member is disposed between the die chamber and the extrusion conduit.

55. The apparatus of claim 49, further comprising a mixing chamber for mixing together the feed mixture, wherein the feed mixture comprises a cement-based feed mixture comprising water, aggregate and binder.

56. The apparatus of claim 55, further comprising:
a vacuum chamber communication with the mixing chamber for directly or indirectly receiving the feed mixture from the mixing chamber; and
a source of negative air pressure communication with the vacuum chamber in order to create a vacuum therein and to the feed mixture in said vacuum chamber to thereby provide a vacuum-treated feed mixture.

57. The apparatus of claim 56, wherein the extrusion conduit is operably connected to the vacuum chamber through which the vacuum-treated feed mixture is directed and extruded to provide an unformed continuous extrudate.

* * * * *